US012024825B2

(12) United States Patent
Bollström et al.

(10) Patent No.: US 12,024,825 B2
(45) Date of Patent: Jul. 2, 2024

(54) METHODS FOR VERIFYING THE AUTHENTICITY OF PRODUCTS

(71) Applicant: Omya International AG, Oftringen (CH)

(72) Inventors: Roger Bollström, Zofingen (CH); Philipp Hunziker, Loveland, OH (US); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 453 days.

(21) Appl. No.: 17/302,518

(22) Filed: May 5, 2021

(65) Prior Publication Data

US 2021/0324584 A1 Oct. 21, 2021

Related U.S. Application Data

(62) Division of application No. 15/776,619, filed as application No. PCT/EP2016/078646 on Nov. 24, 2016, now abandoned.

(Continued)

(30) Foreign Application Priority Data

Nov. 24, 2015 (EP) .................................... 15196085

(51) Int. Cl.
*B41M 3/14* (2006.01)
*B42D 25/29* (2014.01)
(Continued)

(52) U.S. Cl.
CPC .............. *D21H 21/42* (2013.01); *B41M 3/14* (2013.01); *B42D 25/29* (2014.10); *B42D 25/30* (2014.10);
(Continued)

(58) Field of Classification Search
CPC ........ D21H 21/42; D21H 19/82; D21H 21/40; D21H 21/44; D21H 21/48; B41M 3/14;
(Continued)

(56) References Cited

U.S. PATENT DOCUMENTS

| | | | |
|---|---|---|---|
| 7,638,017 | B2 | 12/2009 | Gane et al. |
| 10,406,842 | B2 | 9/2019 | Bollstrom et al. |

(Continued)

FOREIGN PATENT DOCUMENTS

| | | | |
|---|---|---|---|
| EP | 1712523 | A1 | 10/2006 |
| EP | 1712597 | A1 | 10/2006 |

(Continued)

OTHER PUBLICATIONS

The International Search Report dated Feb. 14, 2017 from PCT/EP2016/078646.

(Continued)

*Primary Examiner* — David P Porta
*Assistant Examiner* — Mamadou Faye
(74) *Attorney, Agent, or Firm* — ALGM LLP; Harry J. Guttman

(57) ABSTRACT

The present invention relates to a method of tagging a substrate with a covert, spectroscopically detectable security feature, wherein a liquid treatment composition comprising at least one acid is deposited onto a substrate, which comprises at least one external surface comprising a salifiable alkaline or alkaline earth compound.

20 Claims, 31 Drawing Sheets

Related U.S. Application Data

(60) Provisional application No. 62/261,354, filed on Dec. 1, 2015.

(51) Int. Cl.

| | |
|---|---|
| ***B42D 25/30*** | (2014.01) |
| ***B42D 25/355*** | (2014.01) |
| ***B42D 25/36*** | (2014.01) |
| ***B42D 25/378*** | (2014.01) |
| ***D21H 19/82*** | (2006.01) |
| ***D21H 21/40*** | (2006.01) |
| ***D21H 21/42*** | (2006.01) |
| ***D21H 21/44*** | (2006.01) |
| ***D21H 21/48*** | (2006.01) |
| ***G07D 7/12*** | (2016.01) |
| ***G07D 7/1205*** | (2016.01) |

(52) U.S. Cl.
CPC ........... *B42D 25/355* (2014.10); *B42D 25/36* (2014.10); *B42D 25/378* (2014.10); *D21H 19/82* (2013.01); *D21H 21/40* (2013.01); *D21H 21/44* (2013.01); *D21H 21/48* (2013.01); *G07D 7/12* (2013.01); *G07D 7/1205* (2017.05)

(58) Field of Classification Search
CPC ........ B41M 3/144; B42D 25/29; B42D 25/30; B42D 25/355; B42D 25/36; B42D 25/378; G07D 7/12; G07D 7/1205
See application file for complete search history.

(56) References Cited

U.S. PATENT DOCUMENTS

| | | | | |
|---|---|---|---|---|
| 10,589,556 | B2 | 3/2020 | Bollstrom et al. | |
| 10,618,330 | B2 | 4/2020 | Bollstrom et al. | |
| 2001/0016249 | A1 | 8/2001 | Kitamura et al. | |
| 2004/0071994 | A1 | 4/2004 | Busch et al. | |
| 2005/0031838 | A1 | 2/2005 | Lagunowich et al. | |
| 2005/0120917 | A1* | 6/2005 | Ruger .................. | C09C 1/0021 252/301.4 R |
| 2008/0236447 | A1 | 10/2008 | Argoitia | |
| 2010/0140501 | A1 | 6/2010 | Lawandy | |
| 2011/0091665 | A1 | 4/2011 | Heim | |
| 2011/0250418 | A1* | 10/2011 | Pitcher ................ | B41M 5/5245 428/355 R |
| 2012/0031576 | A1 | 2/2012 | Gane et al. | |
| 2013/0153789 | A1* | 6/2013 | Smith .................... | G01N 21/63 252/301.4 R |
| 2013/0234427 | A1* | 9/2013 | Reichelt ................ | C09D 11/02 427/145 |
| 2014/0151996 | A1 | 6/2014 | Camus | |
| 2015/0037565 | A1* | 2/2015 | Stolarz, Jr. ........... | C08G 18/755 428/327 |
| 2016/0340232 | A1 | 11/2016 | Mitra et al. | |
| 2017/0065974 | A1 | 3/2017 | Bollstrom et al. | |
| 2018/0022135 | A1 | 1/2018 | Bollstrom et al. | |
| 2018/0056690 | A1 | 3/2018 | Bollstrom et al. | |
| 2018/0333975 | A1 | 11/2018 | Bollstrom et al. | |
| 2018/0340298 | A1 | 11/2018 | Bollstrom et al. | |
| 2019/0202223 | A1 | 7/2019 | Bollstrom et al. | |
| 2020/0290386 | A1 | 9/2020 | Bollstrom et al. | |

FOREIGN PATENT DOCUMENTS

| | | | |
|---|---|---|---|
| EP | 2028016 | A2 | 2/2009 |
| EP | 2159258 | A1 | 3/2010 |
| EP | 2264108 | A1 | 12/2010 |
| EP | 2264109 | A1 | 12/2010 |
| EP | 2371766 | A1 | 10/2011 |
| EP | 2447213 | A1 | 5/2012 |
| EP | 2524898 | A1 | 11/2012 |
| EP | 2949813 | A1 | 12/2015 |
| EP | 3067214 | A1 | 9/2016 |
| EP | 3067215 | A1 | 9/2016 |
| EP | 3173522 | A1 | 5/2017 |
| JP | 2008045231 | A | 2/2008 |
| UY | 36135 | A | 8/2015 |
| WO | 0039222 | A1 | 7/2000 |
| WO | 005121257 | A1 | 12/2005 |
| WO | 2008024542 | A1 | 2/2008 |
| WO | 2009074492 | A1 | 6/2009 |
| WO | 2013142473 | A1 | 9/2013 |
| WO | 2014124718 | A1 | 8/2014 |
| WO | 2015181056 | A1 | 12/2015 |
| WO | 2017089448 | A1 | 6/2017 |

OTHER PUBLICATIONS

The Written Opinion of the International Searching Authority dated Feb. 14, 2017 from PCT/EP2016/078646.

JP Patent Appl. No. 2008045231 A (Feb. 28, 2008)—English-language abstract from Espacenet, 1 page.

* cited by examiner

METHODS FOR VERIFYING THE AUTHENTICITY OF PRODUCTS

CROSS-REFERENCE TO RELATED APPLICATIONS

This application is divisional application of U.S. application Ser. No. 15/776,619, filed May 16, 2018 entitled "METHOD OF TAGGING A SUBSTRATE" which is a National Stage Entry of International Application No. PCT/EP2016/078646 filed Nov. 24, 2016, entitled "METHOD OF TAGGING A SUBSTRATE", and which claims the benefit of U.S. Provisional Application No. 62/261,354, filed Dec. 1, 2015 entitled "METHOD OF TAGGING A SUBSTRATE" and also claims priority to EP Application No 15196085.3 filed Nov. 24, 2015 entitled "METHOD OF TAGGING A SUBSTRATE."

The present invention relates to the field of anti-counterfeiting methods, and more particular, to a method for tagging a substrate with a covert security feature, a tagged substrate obtainable by said method and its use.

Product and brand piracy are a widespread and worldwide worrying phenomenon, which may result in commercial losses of the affected companies and may decrease brand value and company reputation. According to the Report on EU customs enforcement of intellectual property rights issued by the European Union in 2014, significant increases in counterfeiting were observed for the categories foodstuffs, alcoholic beverages, jewellery and other accessories, mobile phones, CD/DVDs, toys and games, medicines, car parts and accessories and office stationery. However, products such as ink cartridges and toners, sporting articles, cigarettes and other tobacco products, machines and tools, lighters, labels, tags and stickers and textiles are also often subject to counterfeiting.

Consequently, there is an increasing demand for strategic and technical measures for brand protection and anti-counterfeiting.

With the improvements in desktop publishing and colour-photocopiers, the opportunities for document fraud have increased dramatically. Consequently, there is an increasing demand for security elements that can be used to verify the authenticity of a document, e.g., a passport, a driving licence, bank card, credit card, certificate, or means of payment. Moreover, paper manufactures have to contend with the problem that in particular their label papers and packaging papers are used in counterfeited products. Thus, there is an increasing need for methods for discretely tagging paper materials and methods to verify the origin of paper materials found in counterfeited products.

US 2005/0031838 A1 describes a taggant security system for paper products comprising the incorporation of taggants such as fluorescent dyers or phosphors. However, the inclusion of such taggants can lead to problems during paper production such as repulping.

WO 2008/024542 A1 describes a method, wherein a reflective feature is formed by a direct-write printing process using an ink comprising metallic particles.

US 2014/0151996 A1 relates to security elements with an optical structure making it possible to vary the appearance of the security element when the viewing angle is modified. However, these security elements are visible to the naked eye under specific conditions, and thus, can be easily recognised by a potential counterfeiter.

For completeness, the applicant would like to mention the unpublished European patent application with filing number 14 169 922.3 in its name, which relates to a method of manufacturing a surface-modified material, the unpublished European patent application with filing number 15 159 107.0 in its name, which relates to a method of creating a hidden pattern, and the unpublished European patent application with filing number 15 159 109.6 in its name, which relates to an inkjet printing method.

In view of the foregoing, there remains a need in the art for reliable security elements, which cannot be easily reproduced, and are not detectable by the naked eye.

Accordingly, it is an object of the present invention to provide a method for creating a reliable covert security element, which is difficult to counterfeit, and not easily recognisable to a potential counterfeiter. It is also desirable that the method is easy to implement in existing print facilities. It is also desirable that the method is suitable for both small and large production volume. Furthermore, it is desirable that the method can be used for a great variety of substrates, and does not affect the properties of the substrates in a negative way.

It is also an object of the present invention to provide a covert security element, which can be reliably detected with standard measurement instruments. It is also desirable that the covert security element can be equipped with further functionalities making it machine readable and is combinable with prior art security elements. Furthermore, it is desirable that the covert security element offers the opportunity to create a great variety of specific "fingerprint" security features, which can be assigned to different manufactures and/or can be delivered to different customers.

The foregoing and other objects are solved by the subject-matter as defined herein in the independent claims.

According to one aspect of the present invention, a method of tagging a substrate with a covert, spectroscopically detectable security feature is provided, the method comprising the following steps:

a) providing a substrate, wherein the substrate comprises at least one external surface comprising a salifiable alkaline or alkaline earth compound,
b) providing a liquid treatment composition comprising at least one acid,
c) applying the liquid treatment composition onto at least one region of the at least one external surface to form at least one surface-modified region on or within the at least one external surface, and
d) applying an opaque top layer over the at least one surface-modified region obtained in step c).

According to another aspect of the present invention, a tagged substrate comprising a covert, spectroscopically detectable security feature is provided, obtainable by a method according to the present invention.

According to still another aspect of the present invention, a product comprising a tagged substrate according to the present invention is provided, wherein the product is a branded product, a security document, a non-secure document, or a decorative product, preferably the product is a perfume, a drug, a tobacco product, an alcoholic drug, a bottle, a garment, a packaging, a container, a sporting good, a toy, a game, a mobile phone, a compact disc (CD), a digital video disc (DVD), a blue ray disc, a machine, a tool, a car part, a sticker, a label, a tag, a poster, a passport, a driving licence, a bank card, a credit card, a bond, a ticket, a postage or tax stamp, a banknote, a certificate, a brand authentication tag, a business card, a greeting card, or a wall paper.

According to still another aspect, a use of the tagged substrate according to the present invention in security applications, in overt security elements, in covert security elements, in brand protection, in micro lettering, in micro imaging, in decorative applications, in artistic applications, in visual applications, or in packaging applications is provided.

According to still another aspect of the present invention, a method of verifying the authenticity of a product is provided, comprising the following steps:

I) providing a product with a tagged substrate comprising a covert, spectroscopically detectable security feature according to the present invention, II) recording a spectrum of the substrate by a spectroscopic method, and III) detecting the presence of the security feature by comparing the recorded spectrum with a library of spectra of tagged substrates according to the present invention.

Advantageous embodiments of the present invention are defined in the corresponding sub-claims.

According to one embodiment the at least one external surface of step a) is in form of a laminate or a coating layer comprising the salifiable alkaline or alkaline earth compound. According to another embodiment the substrate is selected from the group consisting of paper, cardboard, containerboard, plastic, non-wovens, cellophane, textile, wood, metal, glass, mica plate, marble, calcite, nitrocellulose, natural stone, composite stone, brick, concrete, and laminates or composites thereof, preferably paper, cardboard, containerboard or plastic. According to still another embodiment the at least one external surface and the substrate of step a) are made from the same material, preferably the substrate comprises the salifiable alkaline or alkaline earth compound in form of a filler material.

According to one embodiment the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or a mixtures thereof, preferably the salifiable alkaline or alkaline earth compound is an alkaline or alkaline earth carbonate being preferably selected from lithium carbonate, sodium carbonate, potassium carbonate, magnesium carbonate, calcium magnesium carbonate, calcium carbonate, or mixtures thereof, more preferably the salifiable alkaline or alkaline earth compound is calcium carbonate, and most preferably the salifiable alkaline or alkaline earth compound is a ground calcium carbonate, a precipitated calcium carbonate and/or a surface-treated calcium carbonate.

According to one embodiment the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulphur compounds, acidic organophosphorus compounds, $HSO_4^-$, $H_2PO_4^-$, or $HPO_4^{2-}$, being at least partially neutralized by a corresponding cation selected from $Li^+$, $Na^+$, $K^+$, $Mg^{2+}$ or $Ca^{2+}$, and mixtures thereof, preferably the at least one acid is selected from the group consisting of hydrochloric acid, sulphuric acid, sulphurous acid, phosphoric acid, oxalic acid, boric acid, suberic acid, succinic acid, sulphamic acid, tartaric acid, and mixtures thereof, more preferably the at least one acid is selected from the group consisting of sulphuric acid, phosphoric acid, boric acid, suberic acid, sulphamic acid, tartaric acid, and mixtures thereof, and most preferably the at least one acid is phosphoric acid and/or sulphuric acid.

According to one embodiment the liquid treatment composition further comprises a fluorescent dye, a phosphorescent dye, an ultraviolet absorbing dye, a near infrared absorbing dye, a thermochromic dye, a halochromic dye, metal ions, transition metal ions, magnetic particles, quantum dots, or a mixture thereof. According to another embodiment the liquid treatment composition comprises the acid in an amount from 0.1 to 100 wt.-%, based on the total weight of the liquid treatment composition, preferably in an amount from 1 to 80 wt.-%, more preferably in an amount from 3 to 60 wt.-%, and most preferably in an amount from 10 to 50 wt.-%. According to still another embodiment the liquid treatment composition is applied in form of a continuous layer or a pattern of repetitive elements or repetitive combination(s) of elements, preferably selected from the group consisting of circles, dots, triangles, rectangles, squares, or lines.

According to one embodiment the opaque top layer is a top coat, a pigment layer, an overprint, a metal coating, a metal foil, a fibre layer, a laminate, a polymer foil, or a paper. According to another embodiment the covert security feature is detectably by a spectroscopic method selected from the group consisting of infrared spectroscopy, X-ray spectroscopy, and combinations thereof, preferably the covert security feature is detectably by a spectroscopic method selected from the group consisting of FTIR spectroscopy, X-ray diffractometry (XRD), energy-dispersive X-ray spectroscopy (EDS), and combinations thereof.

It should be understood that for the purpose of the present invention, the following terms have the following meaning.

For the purpose of the present invention, an "acid" is defined as Brønsted-Lowry acid, that is to say, it is an $H_3O^+$ ion provider. An "acidic salt" is defined as an $H_3O^+$ ion-provider, e.g., a hydrogen-containing salt, which is partially neutralised by an electropositive element. A "salt" is defined as an electrically neutral ionic compound formed from anions and cations. A "partially crystalline salt" is defined as a salt that, on XRD analysis, presents an essentially discrete diffraction pattern. In accordance with the present invention, $pK_a$, is the symbol representing the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: 3rd Edition", 1991, W.H. Freeman & Co. (USA), ISBN 0-7167-2170-8.

The term "basis weight" as used in the present invention is determined according to DIN EN ISO 536:1996, and is defined as the weight in $g/m^2$.

For the purpose of the present invention, the term "coating layer" refers to a layer, covering, film, skin etc., formed, created, prepared etc., from a coating formulation which remains predominantly on one side of the substrate. The coating layer can be in direct contact with the surface of the substrate or, in case the substrate comprises one or more precoating layers and/or barrier layers, can be in direct contact with the top precoating layer or barrier layer, respectively.

For the purpose of the present invention, a "laminate" refers to a sheet of material, which can be applied over a substrate and bonded to the substrate, thereby forming a laminated substrate.

The term "liquid treatment composition" as used herein, refers to a composition in liquid from, which comprises at least one acid, and can be applied to an external surface of the substrate of the present invention.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and water-insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, WO 00/39222 A1, or EP 2 264 108 A1.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

Throughout the present document, the "particle size" of a salifiable alkaline or alkaline earth compound is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger and the remaining 50 wt.-% are smaller than this particle size. For the purpose of the present invention the particle size is specified as weight median particle size $d_{50}$ unless indicated otherwise. For determining the weight median particle size $d_{50}$ value a Sedigraph can be used. The method and the instrument are known to the skilled person and are commonly used to determine grain size of fillers and pigments. The samples are dispersed using a high speed stirrer and ultrasonics.

A "specific surface area (SSA)" of a salifiable alkaline or alkaline earth compound in the meaning of the present invention is defined as the surface area of the compound divided by its mass. As used herein, the specific surface area is measured by nitrogen gas adsorption using the BET isotherm (ISO 9277:2010) and is specified in $m^2/g$.

For the purpose of the present invention, a "rheology modifier" is an additive that changes the rheological behaviour of a slurry or a liquid coating composition to match the required specification for the coating method employed.

A "salifiable" compound in the meaning of the present invention is defined as a compound that is capable of reacting with an acid to form a salt. Examples of salifiable compounds are alkaline or alkaline earth oxides, hydroxides, alkoxides, methylcarbonates, hydroxycarbonates, bicarbonates, or carbonates.

For the purpose of the present invention, the term "surface-modified region" refers to a distinct spatial area, in which the salifiable alkaline or alkaline earth compound of the external surface has been at least partially converted into an acid salt as a result of the application of the liquid treatment composition comprising at least one acid. Accordingly, a "surface-modified region" in the meaning of the present invention comprises at least one acid salt of the salifiable alkaline or alkaline earth compound of the external surface and the at least one acid comprised in the liquid treatment composition. The surface-modified region will have a different chemical composition and crystal structure compared to the original material.

In the meaning of the present invention, a "surface-treated calcium carbonate" is a ground, precipitated or modified calcium carbonate comprising a treatment or coating layer, e.g. a layer of fatty acids, surfactants, siloxanes, or polymers.

In the present context, the term "substrate" is to be understood as any material having a surface suitable for printing, coating or painting on, such as paper, cardboard, containerboard, plastic, cellophane, textile, wood, metal, glass, mica plate, nitrocellulose, stone, or concrete. The mentioned examples are, however, not of limitative character.

For the purpose of the present invention, the "thickness" and "layer weight" of a layer refers to the thickness and layer weight, respectively, of the layer after the applied coating composition has been dried.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

A "suspension" or "slurry" in the meaning of the present invention comprises insoluble solids and water, and optionally further additives, and usually contains large amounts of solids and, thus, is more viscous and can be of higher density than the liquid from which it is formed.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention, a method of tagging a substrate with a covert, spectroscopically detectable security feature is provided. The method comprises the steps of (a) providing a substrate, wherein the substrate comprises at least one external surface comprising a salifiable alkaline or alkaline earth compound, (b) providing a liquid treatment composition comprising at least one acid, (c) applying the liquid treatment composition onto at least one region of the at least one external surface to form at least one surface-modified region on or within the at least one external surface, and (d) applying an opaque top layer over the at least one surface-modified region obtained in step (c).

In the following the details and preferred embodiments of the inventive method will be set out in more details. It is to be understood that these technical details and embodiments also apply to the inventive tagged substrate and the inventive use thereof as well as to products containing the same.

Method Step a)

According to step a) of the method of the present invention, a substrate is provided.

The substrate comprises at least one external surface and may be opaque, translucent, or transparent.

According to one embodiment, the substrate is selected from the group comprising paper, cardboard, containerboard, plastic, non-wovens, cellophane, textile, wood, metal, glass, mica plate, marble, calcite, nitrocellulose, natural stone, composite stone, brick, concrete, and laminates or composites thereof. According to a preferred embodiment, the substrate is selected from the group comprising paper, cardboard, containerboard, or plastic. According to another embodiment, the substrate is a laminate of paper, plastic and/or metal, wherein preferably the plastic and/or metal are in form of thin foils such as for example used in Tetra Pak. However, any other material having a surface suitable for printing, coating or painting on may also be used as substrate.

According to one embodiment of the present invention, the substrate is paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1 000 $g/m^2$, from 20 to 800 $g/m^2$, from 30 to 700 $g/m^2$, or from 50 to 600 $g/m^2$. According to one embodiment, the substrate is paper, preferably having a basis weight from 10 to 400 $g/m^2$, 20 to 300 $g/m^2$, 30 to 200 $g/m^2$, 40 to 100 $g/m^2$, 50 to 90 $g/m^2$, 60 to 80 $g/m^2$, or about 70 $g/m^2$.

According to another embodiment, the substrate is a plastic substrate. Suitable plastic materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resins is poly(tetrafluoro ethylene). The plastic substrate may be filled by a mineral filler, an organic pigment, an inorganic pigment, or mixtures thereof.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure. Preferably the sublayers of the substrate are made from paper, cardboard, containerboard and/or plastic.

The substrate may be permeable or impermeable for solvents, water, or mixtures thereof. According to one embodiment, the substrate is impermeable for water, solvents, or mixtures thereof. Examples for solvents aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to the present invention, the substrate provided in step a) comprises at least one external surface comprising a salifiable alkaline or alkaline earth compound. The at least one external surface may be a laminate or a coating layer, comprising a salifiable alkaline or alkaline earth compound. The laminate or the coating layer can be in direct contact with the surface of the substrate. In case the substrate already comprises one or more precoating layers and/or barrier layers (which will be described in more detail further below), the laminate or coating layer may be in direct contact with the top precoating layer or barrier layer, respectively.

According to one embodiment the at least one external surface and the substrate of step a) are made from the same material. Thus, according to one embodiment of the present invention the substrate comprises a salifiable alkaline or alkaline earth compound. The at least one external surface can be simply the external surface of the substrate or can be a laminate or a coating layer made from the same material as the substrate.

The substrate can also be an uncoated substrate, i.e. the substrate does not contain a coating layer. According to a preferred embodiment, the substrate comprises the salifiable alkaline or alkaline earth compound in form of a filler material. The amount of the salifiable alkaline or alkaline earth compound in the substrate can range from 1 to 99 wt.-%, based on the total weight of the substrate, preferably from 2 to 90 wt.-%, more preferably from 3 to 70 wt.-%, even more preferably from 5 to 50 wt.-%, and most preferably from 8 to 40 wt.-%. According to one embodiment the amount of the salifiable alkaline or alkaline earth compound in the substrate ranges from 10 to 30 wt.-%, based on the total weight of the substrate.

According to one embodiment, the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or a mixtures thereof. Preferably, the salifiable alkaline or alkaline earth compound is an alkaline or alkaline earth carbonate.

The alkaline or alkaline earth carbonate may be selected from lithium carbonate, sodium carbonate, potassium carbonate, magnesium carbonate, calcium magnesium carbonate, calcium carbonate, or mixtures thereof. According to one embodiment, the alkaline or alkaline earth carbonate is calcium carbonate, more preferably the alkaline or alkaline earth carbonate is a ground calcium carbonate, a precipitated calcium carbonate, a modified calcium carbonate and/or a surface-treated calcium carbonate, and most preferably a ground calcium carbonate, a precipitated calcium carbonate and/or a surface-treated calcium carbonate. According to a preferred embodiment, the calcium carbonate is ground calcium carbonate.

Ground (or natural) calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the GCC is obtained by dry grinding. According to another embodiment of the present invention the GCC is obtained by wet grinding and optionally subsequent drying.

In general, the grinding step can be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate comprising mineral material comprises a wet ground calcium carbonate comprising mineral material, the grinding step may be performed under conditions such that autogenous grinding takes place and/or by horizontal ball milling, and/or other such processes known to the skilled man. The wet processed ground calcium carbonate comprising mineral material thus obtained may be washed and dewatered by well-known processes, e.g. by flocculation, centrifugation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment of the present invention, the ground calcium carbonate is selected from the group consisting of marble, chalk, dolomite, limestone and mixtures thereof.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$) and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like form. Vaterite belongs to the hexagonal crystal system. The obtained PCC slurry can be mechanically dewatered and dried.

According to one embodiment of the present invention, the calcium carbonate comprises one precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to another embodiment, the salifiable alkaline or alkaline earth compound may be surface-treated material, for example, a surface-treated calcium carbonate.

A surface-treated calcium carbonate may feature a ground calcium carbonate, a modified calcium carbonate, or a precipitated calcium carbonate comprising a treatment or coating layer on its surface. For example, the calcium carbonate may be treated or coated with a hydrophobising agent such as, e.g., aliphatic carboxylic acids, salts or esters thereof, or a siloxane. Suitable aliphatic acids are, for example, $C_5$ to $C_{28}$ fatty acids such as stearic acid, palmitic acid, myristic acid, lauric acid, or a mixture thereof. The calcium carbonate may also be treated or coated to become cationic or anionic with, for example, a polyacrylate or polydiallyldimethyl-ammonium chloride (polyDADMAC). Surface-treated calcium carbonates are, for example, described in EP 2 159 258 A1 or WO 2005/121257 A1.

According to one embodiment, the surface-treated calcium carbonate comprises a treatment layer or surface coating obtained from the treatment with fatty acids, their salts, their esters, or combinations thereof, preferably from the treatment with aliphatic $C_5$ to $C_{28}$ fatty acids, their salts, their esters, or combinations thereof, and more preferably from the treatment with ammonium stearate, calcium stearate, stearic acid, palmitic acid, myristic acid, lauric acid, or mixtures thereof. According to an exemplary embodiment, the alkaline or alkaline earth carbonate is a surface-treated calcium carbonate, preferably a ground calcium carbonate comprising a treatment layer or surface coating obtained from the treatment with a fatty acid, preferably stearic acid.

In one embodiment, the hydrophobising agent is an aliphatic carboxylic acid having a total amount of carbon atoms from C4 to C24 and/or reaction products thereof. Accordingly, at least a part of the accessible surface area of the calcium carbonate particles is covered by a treatment layer comprising an aliphatic carboxylic acid having a total amount of carbon atoms from C4 to C24 and/or reaction products thereof. The term “accessible” surface area of a material refers to the part of the material surface which is in contact with a liquid phase of an aqueous solution, suspension, dispersion or reactive molecules such as a hydrophobising agent.

The term “reaction products” of the aliphatic carboxylic acid in the meaning of the present invention refers to products obtained by contacting the at least one calcium carbonate with the at least one aliphatic carboxylic acid. Said reaction products are formed between at least a part of the applied at least one aliphatic carboxylic acid and reactive molecules located at the surface of the calcium carbonate particles.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof. For example, the aliphatic carboxylic acid is stearic acid.

Additionally or alternatively, the hydrophobising agent can be at least one mono-substituted succinic anhydride consisting of succinic anhydride mono-substituted with a group selected from a linear, branched, aliphatic and cyclic group having a total amount of carbon atoms from C2 to C30 in the substituent. Accordingly, at least a part of the accessible surface area of the calcium carbonate particles is covered by a treatment layer comprising at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof. It will be appreciated by the skilled person that in case the at least one mono-substituted succinic anhydride consists of succinic anhydride mono-substituted with a branched and/or cyclic group, said group will have a total amount of carbon atoms from C3 to C30 in the substituent.

The term “reaction products” of the mono-substituted succinic anhydride in the meaning of the present invention refers to products obtained by contacting the calcium carbonate with the at least one mono-substituted succinic anhydride. Said reaction products are formed between at least a part of the applied at least one mono-substituted succinic anhydride and reactive molecules located at the surface of the calcium carbonate particles.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent or a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

The term “alkyl” in the meaning of the present invention refers to a linear or branched, saturated organic compound composed of carbon and hydrogen. In other words, “alkyl mono-substituted succinic anhydrides” are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

It is appreciated that e.g. the term “butylsuccinic anhydride” comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term “hexadecanyl succinic anhydride” comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride. Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear alkenyl group having a total amount of carbon atoms from C2 to C30, preferably from C3 to C20 and most preferably from C4 to C18 in the substituent or a branched alkenyl group having a total amount of carbon atoms from C3 to C30, preferably from C4 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Additionally or alternatively, the hydrophobising agent may be a phosphoric acid ester blend. Accordingly, at least a part of the accessible surface area of the calcium carbonate particles is covered by a treatment layer comprising a phosphoric acid ester blend of one or more phosphoric acid mono-ester and/or reaction products thereof and one or more phosphoric acid di-ester and/or reaction products thereof.

The term "reaction products" of the phosphoric acid mono-ester and one or more phosphoric acid di-ester in the meaning of the present invention refers to products obtained by contacting the calcium carbonate with the at least one phosphoric acid ester blend. Said reaction products are formed between at least a part of the applied phosphoric acid ester blend and reactive molecules located at the surface of the calcium carbonate particles.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the coating layer of the calcium carbonate and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the accessible surface area of the calcium carbonate comprises a phosphoric acid ester blend of one phosphoric acid mono-ester and/or reaction products thereof and one phosphoric acid di-ester and/or reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

The phosphoric acid ester blend comprises the one or more phosphoric acid mono-ester and/or reaction products thereof to the one or more phosphoric acid di-ester and/or reaction products thereof in a specific molar ratio. In particular, the molar ratio of the one or more phosphoric acid mono-ester and/or reaction products thereof to the one or more phosphoric acid di-ester and/or reaction products thereof in the treatment layer and/or the phosphoric acid ester blend is from 1:1 to 1:100, preferably from 1:1.1 to 1:60, more preferably from 1:1.1 to 1:40, even more preferably from 1:1.1 to 1:20 and most preferably from 1:1.1 to 1:10.

The wording "molar ratio of the one or more phosphoric acid mono-ester and reaction products thereof to the one or more phosphoric acid di-ester and reaction products thereof" in the meaning of the present invention refers to the sum of the molecular weight of the phosphoric acid mono-ester molecules and/or the sum of the molecular weight of the phosphoric acid mono-ester molecules in the reaction products thereof to the sum of the molecular weight of the phosphoric acid di-ester molecules and/or the sum of the molecular weight of the phosphoric acid di-ester molecules in the reaction products thereof.

In one embodiment of the present invention, the phosphoric acid ester blend coated on at least a part of the surface of the calcium carbonate may further comprise one or more phosphoric acid tri-ester and/or phosphoric acid and/or reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the accessible surface area of the calcium carbonate.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester. Additionally or alternatively, the hydrophobising agent can be at least one aliphatic aldehyde having between 6 and 14 carbon atoms.

In this regard, the at least one aliphatic aldehyde represents a surface treatment agent and may be selected from any linear, branched or alicyclic, substituted or non-substituted, saturated or unsaturated aliphatic aldehyde. Said aldehyde is preferably chosen such that the number of carbon atoms is greater than or equal to 6 and more preferably greater than or equal to 8. Furthermore, said aldehyde has generally a number of carbon atoms that is lower or equal to 14, preferably lower or equal to 12 and more preferably lower or equal to 10. In one preferred embodiment, the number of carbon atoms of the aliphatic aldehyde is between 6 and 14, preferably between 6 and 12 and more preferably between 6 and 10.

In another preferred embodiment, the at least one aliphatic aldehyde is preferably chosen such that the number of carbon atoms is between 6 and 12, more preferably between 6 and 9, and most preferably 8 or 9.

The aliphatic aldehyde may be selected from the group of aliphatic aldehydes consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-6-nonenal, (Z)-6-nonenal, (E)-7-nonenal, (Z)-7-nonenal, 8-nonenal, decanal, (E)-2-decenal, (Z)-2-decenal, (E)-3-decenal, (Z)-3-decenal, (E)-4-decenal, (Z)-4-decenal, (E)-5-decenal, (Z)-5-decenal, (E)-6-decenal, (Z)-6-decenal, (E)-7-decenal, (Z)-7-decenal, (E)-8-decenal, (Z)-8-decenal, 9-decenal, undecanal, (E)-2-undecenal, (Z)-2-undecenal, (E)-3-undecenal, (Z)-3-undecenal, (E)-4-undecenal, (Z)-4-undecenal, (E)-5-undecenal, (Z)-5-undecenal, (E)-6-undecenal, (Z)-6-undecenal, (E)-7-undecenal, (Z)-7-undecenal, (E)-8-undecenal, (Z)-8-undecenal, (E)-9-undecenal, (Z)-9-undecenal, 10-undecenal, dodecanal, (E)-2-dodecenal, (Z)-2-dodecenal, (E)-3-dodecenal, (Z)-3-dodecenal, (E)-4-dodecenal, (Z)-4-dodecenal, (E)-5-dodecenal, (Z)-5-dodecenal, (E)-6-dodecenal, (Z)-6-dodecenal, (E)-7-dodecenal, (Z)-7-dodecenal, (E)-8-dodecenal, (Z)-8-dodecenal, (E)-9-dodecenal, (Z)-9-dodecenal, (E)-10-dodecenal, (Z)-10-dodecenal, 11-dodecenal, tridecanal, (E)-2-tridecenal, (Z)-2-tridecenal, (E)-3-tridecenal, (Z)-3-tridecenal, (E)-4-tridecenal, (Z)-4-tridecenal, (E)-5-tridecenal, (Z)-5-tridecenal, (E)-6-tridecenal, (Z)-6-tridecenal, (E)-7-tridecenal, (Z)-7-tridecenal, (E)-8-tridecenal, (Z)-8-tridecenal, (E)-9-tridecenal, (Z)-9-tridecnal, (E)-10-tridecenal, (Z)-10-tridecenal, (E)-11-tridecenal, (Z)-11-tridecenal, 12-tridecenal, butadecanal, (E)-2-butadecenal, (Z)-2-butadecenal, (E)-3-butadecenal, (Z)-3-butadecenal, (E)-4-butadecenal, (Z)-4-butadecenal, (E)-5-butadecenal, (Z)-5-butadecenal, (E)-6-butadecenal, (Z)-6-butadecenal, (E)-7-butadecenal, (Z)-7-butadecenal, (E)-8-butadecenal, (Z)-8-butadecenal, (E)-9-butadecenal, (Z)-9-butadecenal, (E)-10-butadecenal, (Z)-10-butadecenal, (E)-11-butadecenal, (Z)-11-butadecenal, (E)-12-butadecenal, (Z)-12-butadecenal, 13-butadecenal, and mixtures thereof. In a preferred embodiment, the aliphatic aldehyde is selected from the group consisting of hexanal, (E)-2-hexenal, (Z)-2-hexenal, (E)-3-hexenal, (Z)-3-hexenal, (E)-4-hexenal, (Z)-4-hexenal, 5-hexenal, heptanal, (E)-2-heptenal, (Z)-2-heptenal, (E)-3-heptenal, (Z)-3-heptenal, (E)-4-heptenal, (Z)-4-heptenal, (E)-5-heptenal, (Z)-5-heptenal, 6-heptenal, octanal, (E)-2-octenal, (Z)-2-octenal, (E)-3-octenal, (Z)-3-octenal, (E)-4-octenal, (Z)-4-octenal, (E)-5-octenal, (Z)-5-octenal, (E)-6-octenal, (Z)-6-octenal, 7-octenal, nonanal, (E)-2-nonenal, (Z)-2-nonenal, (E)-3-nonenal, (Z)-3-nonenal, (E)-4-nonenal, (Z)-4-nonenal, (E)-5-nonenal, (Z)-5-nonenal, (E)-6-nonenal, (Z)-6-nonenal, (E)-7-nonenal, (Z)-7-nonenal, 8-nonenal and mixtures thereof.

In another preferred embodiment, the at least one aliphatic aldehyde is a saturated aliphatic aldehyde. In this case the aliphatic aldehyde is selected from the group consisting of hexanal, heptanal, octanal, nonanal, decanal, undecanal, dodecanal, tridecanal, butadecanal and mixtures thereof. Preferably, the at least one aliphatic aldehyde of step (b) in the form of a saturated aliphatic aldehyde is selected from the group consisting of hexanal, heptanal, octanal, nonanal, decanal, undecanal, dodecanal and mixtures thereof. For instance, the at least one aliphatic aldehyde of step (b) in the form of a saturated aliphatic aldehyde is selected from octanal, nonanal and mixtures thereof.

If a mixture of two aliphatic aldehydes, e.g. two saturated aliphatic aldehydes such as octanal and nonanal is used according to the present invention, the weight ratio of octanal and nonanal is from 70:30 to 30:70 and more preferably from 60:40 to 40:60. In one especially preferred embodiment of the present invention, the weight ratio of octanal and nonanal is about 1:1.

According to a preferred embodiment of the present invention, in step a) a substrate is provided, wherein the substrate comprises at least one external surface comprising calcium carbonate, preferably ground calcium carbonate, precipitated calcium carbonate and/or surface-treated calcium carbonate. According to a further preferred embodiment, the at least one external surface is a coating layer comprising calcium carbonate, preferably ground calcium carbonate, precipitated calcium carbonate and/or surface-treated calcium carbonate.

According to one embodiment, the salifiable alkaline or alkaline earth compound is in form of particles having a weight median particle size $d_{50}$ from 15 nm to 200 μm, preferably from 20 nm to 100 μm, more preferably from 50 nm to 50 μm, and most preferably from 100 nm to 2 μm.

According to one embodiment, the salifiable alkaline or alkaline earth compound has a specific surface area (BET) from 4 to 120 $m^2/g$, preferably from 8 to 50 $m^2/g$, as measured using nitrogen adsorption in the BET method, according to ISO 9277.

The amount of the salifiable alkaline or alkaline earth compound in the at least one external surface can range from 40 to 99 wt.-%, based on the total weight of the at least one external surface, preferably from 45 to 98 wt.-%, and more preferably from 60 to 97 wt.-%.

According to one embodiment, the at least one external surface further comprises a binder, preferably in an amount from 1 to 50 wt.-%, based on the total weight of the salifiable alkaline or alkaline earth compound, preferably from 3 to 30 wt.-%, and more preferably from 5 to 15 wt.-%.

Any suitable polymeric binder may be present in the at least one external surface. For example, the polymeric binder may be a hydrophilic polymer such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodion, agar-agar, arrowroot, guar, carrageenan, starch, tragacanth, xanthan, or rhamsan and mixtures thereof. It is also possible to use other binders such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable binders are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

According to one embodiment, the binder is selected from starch, polyvinylalcohol, styrene-butadiene latex, styrene-acrylate, polyvinyl acetate latex, polyolefins, ethylene acrylate, microfibrillated cellulose, nanofibrillated cellulose, microcrystalline cellulose, nanocrystalline cellulose, nanocellulose, cellulose, carboxymethylcellulose, bio-based latex, or mixtures thereof.

According to another embodiment, the at least one external surface does not comprise a binder.

Other optional additives that may be present in the external surface are, for example, dispersants, milling aids, surfactants, rheology modifiers, lubricants, defoamers, optical brighteners, dyes, preservatives, or pH controlling agents. According to one embodiment, the at least one external surface further comprises a rheology modifier. Preferably the rheology modifier is present in an amount of less than 1 wt.-%, based on the total weight of the filler. Suitable materials are known in the art and the skilled person will select the materials such that they do not negatively affect the detectability of the covert security feature.

According to an exemplary embodiment, the salifiable alkaline or alkaline earth compound is dispersed with a dispersant. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the salifiable alkaline or alkaline earth compound. In a preferred embodiment, the salifiable alkaline or alkaline earth compound is dispersed with an amount of 0.05 to 5 wt.-%, and preferably with an amount of 0.5 to 5 wt.-% of a dispersant, based on the total weight of the salifiable alkaline or alkaline earth compound. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The molecular weight $M_w$ of such products is preferably in the range of 2 000 to 15 000 g/mol, with a molecular weight $M_w$ of 3 000 to 7 000 g/mol being especially preferred. The molecular weight $M_w$ of such products is also preferably in the range of 2 000 to 150 000 g/mol, and an $M_w$ of 15 000 to 50 000 g/mol is especially preferred, e.g., 35 000 to 45 000 g/mol. According to an exemplary embodiment, the dispersant is polyacrylate.

The at least one external surface may also comprise active agents, for example, bioactive molecules as additives, for example, enzymes, chromatic indicators susceptible to change in pH or temperature, or fluorescent materials.

The at least external surface, preferably in form of a laminate or a coating layer, may have a thickness of at least 1 μm, e.g. at least 5 μm, 10 μm, 15 μm or 20 μm. Preferably the external surface has a thickness in the range of 1 μm up to 150 μm.

According to one embodiment, the substrate comprises a first side and a reverse side, and the substrate comprises an external surface comprising a salifiable alkaline or alkaline earth compound on the first side and the reverse side. According to a preferred embodiment, the substrate comprises a first side and a reverse side, and the substrate comprises a laminate or a coating layer comprising an alkaline or alkaline earth carbonate, preferably calcium carbonate, on the first side and the reverse side. According to one embodiment, the laminate or coating layer is in direct contact with the surface of the substrate.

According to a further embodiment, the substrate comprises one or more additional precoating layers between the substrate and the at least one external surface comprising a salifiable alkaline or alkaline earth compound. Such additional precoating layers may comprise kaolin, silica, talc, plastic, precipitated calcium carbonate, modified calcium carbonate, ground calcium carbonate, or mixtures thereof. In this case, the coating layer may be in direct contact with the precoating layer, or, if more than one precoating layer is present, the coating layer may be in direct contact with the top precoating layer.

According to another embodiment of the present invention, the substrate comprises one or more barrier layers between the substrate and the at least one external surface comprising a salifiable alkaline or alkaline earth compound. In this case, the at least one external surface may be in direct contact with the barrier layer, or, if more than one barrier layer is present, the at least one external surface may be in direct contact with the top barrier layer. The barrier layer may comprise a polymer, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodion, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable barrier layers are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof. According to one embodiment, the barrier layer comprises latices, polyolefins, polyvinylalcohols, kaolin, talcum, mica for creating tortuous structures (stacked structures), and mixtures thereof.

According to still another embodiment of the present invention, the substrate comprises one or more precoating and barrier layers between the substrate and the at least one external surface comprising a salifiable alkaline or alkaline earth compound. In this case, the at least one external surface may be in direct contact with the top precoating layer or barrier layer, respectively.

According to one embodiment of the present invention, the substrate of step a) is prepared by i) providing a substrate,
ii) applying a coating composition comprising a salifiable alkaline or alkaline earth compound on at least one side of the substrate to form a coating layer, and
iii) optionally, drying the coating layer.

The coating composition can be in liquid or dry form. According to one embodiment, the coating composition is a dry coating composition. According to another embodiment, the coating composition is a liquid coating composition. In this case, the coating layer may be dried.

According to one embodiment of the present invention, the coating composition is an aqueous composition, i.e. a composition containing water as the only solvent. According to another embodiment, the coating composition is a non-aqueous composition. Suitable solvents are known to the skilled person and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to one embodiment of the present invention, the solids content of the coating composition is in the range from 5 wt.-% to 75 wt.-%, preferably from 20 to 67 wt.-%, more preferably from 30 to 65 wt.-%, and most preferably from 50 to 62 wt.-%, based on the total weight of the composition. According to a preferred embodiment, the coating composition is an aqueous composition having a solids content in the range from 5 wt.-% to 75 wt.-%, preferably from 20 to 67 wt.-%, more preferably from 30 to 65 wt.-%, and most preferably from 50 to 62 wt.-%, based on the total weight of the composition.

According to one embodiment of the present invention, the coating composition has a Brookfield viscosity of between 10 and 4 000 mPa·s at 20° C., preferably between 100 and 3 500 mPa·s at 20° C., more preferably between 200 and 3 000 mPa·s at 20° C., and most preferably between 250 and 2 000 mPa·s at 20° C.

According to one embodiment, method steps ii) and iii) are also carried out on the reverse side of the substrate to manufacture a substrate being coated on the first and the reverse side. These steps may be carried out for each side separately or may be carried out on the first and the reverse side simultaneously.

According to one embodiment of the present invention, method steps ii) and iii) are carried out two or more times using a different or the same coating composition.

According to one embodiment of the present invention, one or more additional coating compositions are applied onto at least one side of the substrate before method step ii). The additional coating compositions may be precoating compositions and/or a barrier layer compositions.

The coating compositions may be applied onto the substrate by conventional coating means commonly used in this art. Suitable coating methods are, e.g., air knife coating, electrostatic coating, metering size press, film coating, spray coating, wound wire rod coating, slot coating, slide hopper coating, gravure, curtain coating, high speed coating and the like. Some of these methods allow for simultaneous coatings of two or more layers, which is preferred from a manufacturing economic perspective. However, any other coating method which would be suitable to form a coating layer on the substrate may also be used. According to an exemplary embodiment, the coating composition is applied by high speed coating, metering size press, curtain coating, spray coating, flexo and gravure, or blade coating, preferably curtain coating.

According to step iii), the coating layer formed on the substrate is dried. The drying can be carried out by any method known in the art, and the skilled person will adapt the drying conditions such as the temperature according to his process equipment. For example, the coating layer can be dried by infrared drying and/or convection drying. The drying step may be carried out at room temperature, i.e. at a temperature of 20° C.±2° C. or at other temperatures. According to one embodiment, method step iii) is carried out at substrate surface temperature from 25 to 150° C., preferably from 50 to 140° C., and more preferably from 75 to 130° C. Optionally applied precoating layers and/or barrier layers can be dried in the same way.

After coating, the coated substrate may be subject to calendering or super-calendering to enhance surface smoothness. For example, calendering may be carried out at a temperature from 20 to 200° C., preferably from 60 to 100° C. using, for example, a calender having 2 to 12 nips. Said nips may be hard or soft, hard nips, for example, can be made of a ceramic material. According to one exemplary embodiment, the coated substrate is calendered at 300 kN/m to obtain a glossy coating. According to another exemplary embodiment, the coated substrate is calendered at 120 kN/m to obtain a matt coating.

According to one embodiment, the coating layer has a coat weight from 0.5 to 100 g/$m^2$, preferably from 1 to 75 g/$m^2$, more preferably from 2 to 50 g/$m^2$, and most preferably from 4 to 25 g/$m^2$.

Method Step b)

According to step b) of the method of the present invention, a liquid treatment composition comprising at least one acid is provided.

The liquid treatment composition may comprise any inorganic or organic acid that forms $CO_2$ when it reacts with a salifiable alkaline or alkaline earth compound. According to one embodiment, the at least one acid is an organic acid, preferably a monocarboxylic, dicarboxylic or tricarboxylic acid.

According to one embodiment, the at least one acid is a strong acid having a $pK_a$ of 0 or less at 20° C. According to another embodiment, the at least one acid is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the acid is preferably selected from $H_2SO_3$, $H_3PO_4$, oxalic acid, or mixtures thereof. However, acids having a $pK_a$ of more than 2.5 may also be used, for example, suberic acid, succinic acid, acetic acid, citric acid, formic acid, sulphamic acid, tartaric acid, benzoic acid, or phytic acid.

The at least one acid can also be an acidic salt, for example, $HSO_4^-$, $H_2PO_4^-$ or $HPO_4^{2-}$, being at least partially neutralized by a corresponding cation such as $Li^+$, $Na^+$, $K^+$, $Mg^{2+}$ or $Ca^{2+}$. The at least one acid can also be a mixture of one or more acids and one or more acidic salts.

According to one embodiment of the present invention, the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulphur compounds, acidic organophosphorus compounds, $HSO_4^-$, $H_2PO_4^-$ or $HPO_4^{2-}$, being at least partially neutralized by a corresponding cation selected from $Li^+$, $Na^+$, $K^+$, $Mg^{2+}$ or $Ca^{2+}$, and mixtures thereof. According to a preferred embodiment, the at least one acid is selected from the group consisting of hydrochloric acid, sulphuric acid, sulphurous acid, phosphoric acid, oxalic acid, boric acid, suberic acid, succinic acid, sulphamic acid, tartaric acid, and mixtures thereof, more preferably the at least one acid is selected from the group consisting of sulphuric acid, phosphoric acid, boric acid, suberic acid, sulphamic acid, tartaric acid, and mixtures thereof, and most preferably the at least one acid is phosphoric acid and/or sulphuric acid.

Acidic organosulphur compounds may be selected from sulphonic acids such as Nafion, p-toluenesulphonic acid, methanesulphonic acid, thiocarboxylic acids, sulphinic acids and/or sulphenic acids. Examples for acidic organophosphorus compounds are aminomethylphosphonic acid, 1-hydroxyethylidene-1,1-diphosphonic acid (HEDP), amino tris (methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), diethylenetriamine penta(methylene phosphonic acid) (DTPMP), phosphonobutane-tricarboxylic acid (PBTC), N-(phosphonomethyl)iminodiacetic acid (PMIDA), 2-carboxyethyl phosphonic acid (CEPA), 2-hydroxyphosphonocarboxylic acid (HPAA), Amino-tris-(methylene phosphonic acid) (AMP), or di-(2-ethylhexyl) phosphoric acid.

The at least one acid may consist of only one type of acid. Alternatively, the at least one acid can consists of two or more types of acids.

The at least one acid may be applied in concentrated form or in diluted form. According to one embodiment of the present invention, the liquid treatment composition comprises at least one acid and water. According to another embodiment of the present invention, the liquid treatment composition comprises at least one acid and a solvent. According to another embodiment of the present invention, the liquid treatment composition comprises at least one acid, water, and a solvent. Suitable solvents are known in the art and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to still another embodiment of the present invention, the liquid treatment composition comprises at least one acid, water, and a surfactant. Suitable surfactants are known to the skilled person and may be preferably selected from non-ionic surfactants. According to one embodiment the non-ionic surfactant is an alkylphenol hydroxypolyethylene, a polyethoxylated sorbitan ester, or a mixture thereof. Examples of a suitable alkylphenol hydroxypolyethylene are surfactants of the triton-X series such as triton X-15, triton X-35, triton X-45, triton X-100, triton X-102, triton X-114, triton X-165, triton X-305, triton X-405, or triton X-705, which are, for example, commercially available from Dow Chemical Company, USA. Examples of a suitable polyethoxylated sorbitan ester are surfactants of the tween series such as tween 20 (polysorbate 20), tween 40 (polysorbate 40), tween 60 (polysorbate 60), tween 65 (polysorbate 65), or tween 80 (polysorbate 80), which are, for example, commercially available from Merck KGaA, Germany. According to one embodiment the surfactant is a non-ionic surfactant, preferably triton X-100 and/or tween 80, and most preferably triton X-100. The surfactant may be present in the liquid treatment composition in an amount of up to 8 wt.-%, based on the total weight of the liquid treatment composition.

According to one exemplary embodiment, the liquid treatment composition comprises phosphoric acid, ethanol, and water, preferably the liquid treatment composition comprises 30 to 50 wt.-% phosphoric acid, 10 to 30 wt.-% ethanol, and 20 to 40 wt.-% water, based on the total weight of the liquid treatment composition. According to another exemplary embodiment, the liquid treatment composition comprises 20 to 40 vol.-% phosphoric acid, 20 to 40 vol.-% ethanol, and 20 to 40 vol.-% water, based on the total volume of the liquid treatment composition. It is appreciated that the balance up to 100 wt.-%, based on the total weight of the liquid treatment composition, is water. It is also appreciated that the balance up to 100 vol.-%, based on the total volume of the liquid treatment composition, is water.

According to one exemplary embodiment, the liquid treatment composition comprises sulphuric acid, ethanol, and water, preferably the liquid treatment composition comprises 1 to 10 wt.-% sulphuric acid, 10 to 30 wt.-% ethanol, and 70 to 90 wt.-% water, based on the total weight of the liquid treatment composition. According to another exemplary embodiment, the liquid treatment composition comprises 10 to 30 vol.-% sulphuric acid, 10 to 30 vol.-% ethanol, and 50 to 80 vol.-% water, based on the total volume of the liquid treatment composition. It is appreciated that the balance up to 100 wt.-%, based on the total weight of the liquid treatment composition, is water. It is also appreciated that the balance up to 100 vol.-%, based on the total volume of the liquid treatment composition, is water.

According to one exemplary embodiment, the liquid treatment composition comprises phosphoric acid, surfactant, and water, preferably the liquid treatment composition comprises 30 to 50 wt.-% phosphoric acid, 1 to 6 wt.-% surfactant, and 40 to 70 wt.-% water, based on the total weight of the liquid treatment composition. According to another exemplary embodiment, the liquid treatment composition comprises sulphuric acid, surfactant, and water, preferably the liquid treatment composition comprises 1 to 10 wt.-% sulphuric acid, 1 to 6 wt.-% surfactant, and 80 to 98 wt.-% water, based on the total weight of the liquid treatment composition. The surfactant may be a non-ionic surfactant, preferably triton X-100 and/or tween 80, and most preferably triton X-100. It is appreciated that the balance up to 100 wt.-%, based on the total weight of the liquid treatment composition, is water.

According to one embodiment, the liquid treatment composition comprises the at least one acid in an amount from 0.1 to 100 wt.-%, based on the total weight of the liquid treatment composition, preferably in an amount from 1 to 80 wt.-%, more preferably in an amount from 2 to 50 wt.-%, and most preferably in an amount from 5 to 30 wt.-%.

In addition to the at least one acid, the liquid treatment composition may further comprise a fluorescent dye, a phosphorescent dye, an ultraviolet absorbing dye, a near infrared absorbing dye, a thermochromic dye, a halochromic dye, metal ions, transition metal ions, magnetic particles, quantum dots, or a mixture thereof. Such additional compounds can equip the created tagged substrate with additional features, such as specific light absorbing properties, electromagnetic radiation reflection properties, fluorescence properties, phosphorescence properties, magnetic properties, or electric conductivity.

Method Step c)

According to method step c), the liquid treatment composition is applied onto the at least one region of the at least one external surface to form at least one surface-modified region on or within the at least one external surface. Thereby, a security feature is formed on the at least one external surface, which is spectroscopically detectable.

The liquid treatment composition can be applied onto at least one region of the coating layer by any suitable method known in the art.

According to one embodiment, the liquid treatment composition is applied by spray coating, inkjet printing, offset printing, flexographic printing, screen printing, plotting, contact stamping, rotogravure printing, spin coating, reverse (counter-rotating) gravure coating, slot coating, curtain coating, slide bed coating, film press, metered film press, blade coating, brush coating and/or a pencil. Preferably, the liquid treatment composition is applied by spray coating. According to one embodiment the spray coating is combined with a shutter in order to create a pattern. According to another embodiment, the liquid treatment composition is applied by continuous inkjet printing, intermitting inkjet printing and/or drop-on-demand inkjet printing.

The liquid treatment composition can be applied onto the at least one external surface by depositing the treatment composition onto the top of the at least one external surface. Alternatively or additionally, in case the substrate is permeable for liquids, the liquid treatment composition can be applied to the at least one external surface by depositing the treatment composition onto the reverse side of the substrate. Substrates which are permeable for liquids are, for example, porous substrates such as paper or textile, woven or non-woven fabrics, or fleece.

The application of the liquid treatment composition onto the at least one external surface can be carried out at a surface temperature of the substrate, which is at room temperature, i.e. at a temperature of 20±2° C., or at an elevated temperature, for example, at about 70° C. Carrying out method step b) at an elevated temperature may enhance the drying of the liquid treatment composition, and, hence, may reduce production time. According to one embodiment, method step b) is carried out at a substrate surface temperature of more than 5° C., preferably more than 10° C., more preferably more than 15° C., and most preferably more than 20° C. According to one embodiment, method step b) is carried out at a substrate surface temperature which is in the range from 5 to 120° C., more preferably in the range from 10 to 100° C., more preferably in the range from 15 to 90° C., and most preferably in the range from 20 to 80° C.

The liquid treatment composition can be applied in form of a continuous layer or a pattern of repetitive elements. According to one embodiment of the present invention, the liquid treatment composition is continuously applied to the entire at least one external surface. Thereby, a continuous surface-modified region or layer can be formed above the at least one external surface.

According to another embodiment, the liquid treatment composition is applied to the at least one external surface in form of a pattern of repetitive elements, preferably selected from the group consisting of circles, dots, triangles, rectangles, squares, or lines.

Without being bound to any theory, it is believed that by the application of the liquid treatment composition to the external surface, the salifiable alkaline or alkaline earth compound of the external surface reacts with the acid included in the treatment composition. Thereby the salifiable alkaline or alkaline earth compound is at least partially converted into an acid salt, which has a different chemical composition and crystal structure compared to the original material. In case the salifiable alkaline or alkaline earth compound is an alkaline or alkaline earth carbonate, for example, the compound would be converted by the acid treatment into a non-carbonate alkaline or alkaline earth salt.

By applying the liquid treatment composition according to method step c), the salifiable alkaline or alkaline earth compound can be converted into a water-insoluble or water-soluble salt.

According to one embodiment, the surface-modified region comprises an acid salt of the salifiable alkaline or alkaline earth compound. According to another embodiment, the surface-modified region comprises a non-carbonate alkaline or alkaline earth salt, preferably a water-insoluble non-carbonate alkaline or alkaline earth salt. According to a preferred embodiment, the surface-modified region comprises a non-carbonate calcium salt, preferably a water-insoluble non-carbonate calcium salt. In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

According to one embodiment of the present invention, the liquid treatment composition comprises phosphoric acid, and the obtained surface-modified regions comprise at least one alkaline or alkaline earth phosphate. According to a preferred embodiment, the at least one alkaline or alkaline earth compound is calcium carbonate, the liquid treatment composition comprises phosphoric acid, and the obtained surface-modified regions comprise hydroxyapatite, calcium hydrogen phosphate hydrate calcium phosphate, brushite, and combinations thereof, preferably calcium phosphate and/or brushite.

According to another embodiment of the present invention, the liquid treatment composition comprises sulphuric acid, and the obtained surface-modified regions comprise at least one alkaline or alkaline earth sulphate. According to a preferred embodiment, the at least one alkaline or alkaline earth compound is calcium carbonate, the liquid treatment composition comprises phosphoric acid, and the obtained surface-modified regions comprise gypsum.

Method Step d)

According to method step d), an opaque top layer is applied over the at least one surface-modified region obtained in step c). Thereby, the security feature formed by the surface-modified region is covert.

The opaque top layer can be made from any material, which is suitable to cover the at least one surface-modified region such that it is not visible to the naked eye. For the purpose of the present invention, the term "opaque" means that the material is neither transparent nor translucent, but transmits little to no visible light, i.e. electromagnetic radiation at a wavelength from 400 to 700 nm. According to one embodiment, less than 1% of incoming light having a wavelength from 400 to 700 nm is transmitted through the opaque top layer at a layer thickness of 2 mm. Preferably less than 0.5%, more preferably less than 0.1%, and most preferably less than 0.01% of the incoming light is transmitted through the opaque top layer.

According to one embodiment, the opaque top layer is a top coat, a pigment layer, an overprint, a metal coating, a metal foil, a fibre layer, a laminate, a polymer foil, or a paper. According to a preferred embodiment, the metal coating and/or metal foil comprises aluminium, silver, copper, bronze, or brass.

According to one embodiment, the opaque top layer comprises a pigment. According to an exemplary embodiment, the pigment has a specific surface area of from 0.1 to 200 $m^2/g$, e.g., from 0.3 to 100 $m^2/g$ or from 0.5 to 50 $m^2/g$. The pigment may feature a $d_{50}$ value from about 0.1 to 10 μm, from about 0.2 to 6.0 μm, or from about 0.25 to 4.0 μm. Preferably, the pigment has a $d_{50}$ value from about 0.3 to 3.0 μm.

The pigment can be a mineral pigment or a synthetic pigment. A suitable mineral pigment may be a salifiable alkaline or alkaline earth compound as described above. Examples for further mineral pigments comprise silica, alumina, titanium dioxide, clay, calcined clays, barium sulphate, or zinc oxide. Examples of synthetic pigments include plastic pigments, such as styrene pigments and Ropaque. According to one embodiment, the opaque top layer comprises a pigment selected from the group consisting of ground calcium carbonate, precipitated calcium carbonate, modified calcium carbonate, surface-treated calcium carbonate, dolomite, silica, alumina, titanium dioxide, clay, calcined clays, barium sulphate, zinc oxide, styrene pigments, Ropaque, or mixture thereof.

The amount of the pigment in the opaque top layer may be 40 to 100 wt.-%, e.g., from 45 to 99 w.-%, preferably between 60 and 98 wt.-% based on the total weight of the opaque top layer.

The opaque top layer can further contain a binder. Any suitable polymeric binder may be used in the absorptive layer of the invention. For example, the polymeric binder may be a hydrophilic polymer such as, for example, poly (vinyl alcohol), poly(vinyl pyrrolidone), gelatin, cellulose ethers, poly(oxazolines), poly(vinylacetamides), partially hydrolyzed poly(vinyl acetate/vinyl alcohol), poly(acrylic acid), poly(acrylamide), poly(alkylene oxide), sulphonated or phosphated polyesters and polystyrenes, casein, zein, albumin, chitin, chitosan, dextran, pectin, collagen derivatives, collodion, agar-agar, arrowroot, guar, carrageenan, starch, tragacanth, xanthan, or rhamsan and mixtures thereof. It is also possible to use other binders such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like.

According to one embodiment, the binder is a natural binder selected from starch and/or polyvinyl alcohol. According to another embodiment, the binder is a synthetic binder selected from styrene-butadiene latex, styrene-acrylate latex, or polyvinyl acetate latex. The opaque top layer can also obtain mixtures of hydrophilic and latex binders, for example, a mixture of polyvinyl alcohol and styrene-butadiene latex.

According to one embodiment, the amount of binder in the opaque top layer is between 0 and 60 wt.-%, between 1 and 50 wt.-%, or between 3 and 40 wt.-%, based on the total weight of the pigment.

The opaque top layer may contain further, optional additives. Suitable additives can comprise, for example, dispersants, milling aids, surfactants, rheology modifiers, defoamers, optical brighteners, dyes, or pH controlling agents. According to one exemplary embodiment, the additive is a cationic additive, e.g. a cationic dye fixing agent, or a metal ion flocculent for pigmented inks.

According to an exemplary embodiment, the pigment is dispersed with a dispersant. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the coating formulation. In a preferred embodiment, the pigment is dispersed with an amount of 0.05 to 5 wt.-%, and preferably with an amount of 0.5 to 5 wt.-% of a dispersant, based on the total weight of the coating formulation. As suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The molecular weight $M_w$ of such products is preferably in the range of 2 000-15 000 g/mol, with a molecular weight $M_w$ of 3 000-7 000 g/mol being especially preferred. The molecular weight $M_w$ of such products is also preferably in the range of 2 000 to 150 000 g/mol, and an $M_w$ of 15 000 to 50 000 g/mol is especially preferred, e.g., 35 000 to 45 000 g/mol. According to an exemplary embodiment, the dispersant is polyacrylate.

According to one embodiment of the present invention, the opaque top layer comprises a pigment, preferably in an amount from 40 to 100 wt.-%, based on the total weight of the opaque top layer, and a binder, preferably in an amount from 0 to 60 wt.-%, based on the total weight of the pigment. In case the pigment is a salifiable alkaline or alkaline earth compound, the salifiable alkaline or alkaline earth compound may react with the acid included in the treatment composition applied in method step c). Thereby the salifiable alkaline or alkaline earth compound can be at least partially converted into an acid salt, which has a different chemical composition and crystal structure compared to the original material. In other words, at least one additional surface-modified region can be formed within the opaque top layer. In case the salifiable alkaline or alkaline earth compound is an alkaline or alkaline earth carbonate, for example, the compound would be converted by the acid treatment into a non-carbonate alkaline or alkaline earth salt.

According to a preferred embodiment, the pigment is calcium carbonate, preferably ground calcium carbonate, precipitated calcium carbonate, modified calcium carbonate, or mixtures thereof.

According to an exemplary embodiment, the opaque top layer comprises calcium carbonate, preferably ground calcium carbonate, in an amount from 80 to 100 wt.-%, preferably 100 wt.-%, based on the total weight of the opaque top layer, and a binder, preferably in an amount from 1 to 15 wt.-%, preferably 8 wt.-%, based on the total weight of the pigment.

The opaque top layer may have a thickness of at least 0.1 μm, e.g. at least 0.5 μm, 1 μm, 1.5 μm, 2 μm, 5 μm or 10 μm. Furthermore, the opaque top layer can have a coat weight in a range from 3 to 50 g/m$^2$, 3 to 40 g/m$^2$, or 6 to 20 g/m$^2$. When selecting a suitable thickness of the opaque top layer, the skilled person will consider the Beer-Lambert expression, i.e. $I=I_0 e^{-\beta x}$, where I is the intensity of the detected light, $I_0$ is the intensity of the incoming light produced by the measuring device, β is the attenuation coefficient, and x is the path length through the layer, i.e. the thickness of the opaque top layer. Thus, the skilled person will adapt the thickness of the opaque top layer x to the known value of β and the intensity of the light produced by the measuring device $I_0$.

The opaque top layer may be applied onto the at least one surface-modified region in form of a coating formulation by conventional coating means commonly used in this art. Suitable coating methods are, e.g., air knife coating, electrostatic coating, metered size press, film coating, spray coating, wire wound rod coating, slot coating, slide hopper coating, gravure, curtain coating, blade coating, high speed coating and the like. Some of these methods allow for simultaneous coatings of two or more layers, which is preferred from a manufacturing economic perspective. In an exemplary embodiment the opaque top layer is applied by high speed coating, metered size press, curtain coating, spray coating, blade coating, or electrostatic coating.

According to another exemplary embodiment, the coating formulation is prepared using aqueous suspension of dispersed pigment having a solid content of between 10 wt.-% and 82 wt.-%, preferably between 50 wt.-% and 81 wt.-%, and more preferably between 70 wt.-% and 78 wt.-%, based on the total weight of the aqueous suspension of dispersed calcium carbonate. The coating formulation may have a Brookfield viscosity in the range of 20 to 3 000 mPa·s, preferably from 150 to 3 000 mPa·s, and more preferably from 300 to 2 500 mPa·s.

After being dried, the opaque top layer can be further treated. For example, calendering may be carried out at a temperature from 20 to 200° C., preferably from 60 to 100° C. using, for example, a calender having 2 to 12 nips. Said nips may be hard or soft, hard nips for example made of a ceramic material. According to one exemplary embodiment, the opaque top layer is calendered at 300 kN/m to obtain a glossy coating. According to another exemplary embodiment, the opaque top layer is calendered at 120 kN/m to obtain a matt coating.

According to one embodiment, process step d) consists of applying an opaque top layer over the at least one surface-modified region obtained in step c) by calendaring the at least one external surface. Thereby, the surface-modified regions may be pressed within the substrate and the at least one external surface may be smoothen resulting in a coverage of the surface-modified regions.

According to another embodiment, the opaque top layer is applied by printing, for example, by inkjet printing, offset printing, flexographic printing, screen printing, plotting, contact stamping, or rotogravure printing. According to one embodiment, the opaque top layer applied over the at least one surface-modified region by printing an ink comprising a pigment or dye thereon. Thereby, an overprint is formed covering the underlying surface-modified region.

According to still another embodiment, the opaque top layer is applied by atomic layer deposition. For example, in case the opaque coating layer is a metal coating, the metal can be applied onto the at least one surface-modified region by atomic layer deposition. Alternatively, a metal coating can be applied by a metalizing process, for example, by vacuum metalizing, thermal spray processes, or cold spray processes.

Additional Method Steps

According to a further embodiment of the present invention, the substrate provided in step a) comprises on the first side a first external surface and on the reverse side a second external surface, wherein the first and the second external surface comprise a salifiable alkaline or alkaline earth compound, and in step c) the liquid treatment composition comprising at least one acid is applied onto the first and the second external surface on the first and the reverse side to form at least one surface-modified region on the first and the reverse side, and in step d) an opaque top layer is applied over the at least one surface-modified region on the first and the reverse side. Steps c) and/or d) may be carried out for each side separately or may be carried out on the first and the reverse side simultaneously.

According to one embodiment of the present invention, method step c) is carried out two or more times using a different or the same liquid treatment composition. Thereby, different surface-modified regions with different compositions and properties can be created.

Furthermore, additional layers may be applied between the at least one surface-modified region and the opaque top layer or above the opaque top layer. According to one embodiment, the method of the present invention further comprises a step of applying at least one ink absorbing layer after step c) and before step d). According to another embodiment, the method of the present invention further comprises a step of applying at least one glossy layer after step d). According to still another embodiment, the method of the present invention further comprises a step of applying a metal layer after step d) by atomic layer deposition and/or a metalizing process.

According to still another embodiment, the method of the present invention further comprises a step of applying a protective layer after step d). The protective layer can be made from any material, which is suitable to protect the underlying hidden pattern against unwanted environmental impacts or mechanical wear, and does not affect the spectroscopic detection of the covert security feature. Examples for suitable materials are resins, varnishes, silicones, polymers, or cellulose-based materials.

The Tagged Substrate

According to one aspect of the present invention, a tagged substrate comprising a covert, spectroscopically detectable security feature, obtainable by a method according to the present invention, is provided.

According to a further aspect of the present invention, a tagged substrate comprising a covert, spectroscopically detectable security feature is provided, wherein the substrate comprises at least one external surface comprising a salifiable alkaline or alkaline earth compound, and wherein the at least one external surface comprises at least one surface-modified region, wherein the at least one surface-modified region comprises an acid salt of the salifiable alkaline or alkaline earth compound. Preferably, the salifiable alkaline or alkaline earth compound is an alkaline or alkaline earth carbonate, preferably a calcium carbonate, and the surface-modified region comprises a non-carbonate alkaline or alkaline earth salt, preferably a non-carbonate calcium salt.

The inventors of the present invention found that due to their different chemical composition and/or crystal structure, the formed surface-modified regions may exhibit different spectroscopic properties, which can be detected by the appropriate equipment. Furthermore, the surface-modified regions are covered by the opaque top layer, and are therefore invisible to the naked or unaided human eye. Thus, the surface-modified regions can provide a covert taggant or security feature, which can be traced and allows authentication of the substrate.

Furthermore, the inventors of the present invention found that by using a specific liquid treatment composition, a paper manufacturer can equip his paper products with an individual security feature, which can be easily distinguished from those of other manufactures using a different liquid treatment composition. Finally, the converted minerals formed in the surface-modified regions are environmentally friendly and fully recyclable, and the use of harmful polymers can be avoided.

The covert surface-modified region or covert security feature may be detected with a spectroscopic method such as infrared spectroscopy or X-ray spectroscopy by measuring a spectrum of the tagged substrate and comparing the same with a spectrum of the original, untagged substrate.

In the meaning of the present invention, the term "infrared (IR) spectroscopy" refers to the analysis of infrared light interacting with molecules of a sample, wherein the analysis can be carried out by measuring the absorption, emission, or reflection of the infrared light. IR spectroscopy techniques, which may be used to detect the covert security feature, are known to the skilled person. Examples of suitable IR spectroscopy techniques are dispersive infrared spectroscopy, Fourier-transform infrared (FTIR) spectroscopy, transmission infrared spectroscopy, attenuated total reflectance (ATR) infrared spectroscopy, specular reflectance infrared spectroscopy, diffuse reflectance spectroscopy, or photoacoustic infrared spectroscopy.

The term "X-ray spectroscopy" as used herein refers to spectroscopic methods utilizing X-ray excitation. X-ray spectroscopy techniques, which may be used to detect the covert security feature, are known to the skilled person. Examples of suitable X-ray spectroscopy techniques are X-ray absorption spectroscopy, X-ray emission spectroscopy, X-ray fluorescence spectroscopy (XRF), X-ray diffractometry (XRD), energy-dispersive X-ray spectroscopy (EDS), or wavelength-dispersive X-ray spectroscopy (WDS).

According to one embodiment of the present invention, the covert security feature is detectably by a spectroscopic method selected from the group consisting of infrared spectroscopy, X-ray spectroscopy, and combinations thereof. According to a preferred embodiment, the covert security feature is detectably by a spectroscopic method selected from the group consisting of FTIR spectroscopy, X-ray diffractometry (XRD), energy-dispersive X-ray spectroscopy (EDS), and combinations thereof.

Additionally or alternatively, the covert security feature may be detected by laser ablation inductively coupled plasma mass spectrometry (LA-ICP-MS). Thus, according to another embodiment of the present invention, a tagged substrate comprising a covert security feature, obtainable by a method according to the present invention, is provided, wherein the covert security feature is detectable by laser ablation inductively coupled plasma mass spectrometry (LA-ICP-MS).

According to one embodiment, a method of tagging a substrate with a covert, spectroscopically detectable security feature is provided, the method comprising the method steps a) to d), wherein the covert security feature is detectably by a spectroscopic method selected from the group consisting of infrared spectroscopy, X-ray spectroscopy, and combinations thereof. Preferably the covert security feature is detectable by a spectroscopic method selected from the group consisting of FTIR spectroscopy, X-ray diffractometry (XRD), energy-dispersive X-ray spectroscopy (EDS), and combinations thereof, and most preferably the covert security feature is detectable by X-ray diffraction (XRD).

The covert security feature of the present invention may also be combined with other security features such as optically variable features, embossing, watermarks, threads, or holograms.

Generally the tagged substrate comprising the covert, spectroscopically detectable security feature of the present invention may be employed in any product that is subject to counterfeiting, imitation or copying.

According to a further aspect of the present invention, a product comprising a tagged substrate according to the present invention is provided, wherein the product is a branded product, a security document, a non-secure document, or a decorative product, preferably the product is a perfume, a drug, a tobacco product, an alcoholic drug, a bottle, a garment, a packaging, a container, a sporting good, a toy, a game, a mobile phone, a compact disc (CD), a digital video disc (DVD), a blue ray disc, a machine, a tool, a car part, a sticker, a label, a tag, a poster, a passport, a driving licence, a bank card, a credit card, a bond, a ticket, a postage or tax stamp, a banknote, a certificate, a brand authentication tag, a business card, a greeting card, a wall paper, or facade.

As already mentioned above, the tagged substrate according to the present invention is suitable for a wide range of applications. The skilled person will appropriately select the type of tagged substrate for the desired application.

According to one embodiment of the present invention, the tagged substrate according to the present invention is used in security applications, in overt security elements, in covert security elements, in brand protection, in microlettering, in micro imaging, in decorative applications, in artistic applications, in visual applications, or in packaging applications.

The authenticity of a product comprising the tagged substrate of the present invention, can be verified by a spectroscopic method. The spectroscopic measurement can be carried out in a laboratory or may be carried out on-site, for example, by using portable spectrometers or handheld devices.

According to a further aspect of the present invention, a method of verifying the authenticity of a product is provided, comprising the following steps:

I) providing a product with a tagged substrate comprising a covert, spectroscopically detectable security feature according to the present invention, II) recording a spectrum of the substrate by a spectroscopic method, and III) detecting the presence of the security feature by comparing the recorded spectrum with a library of spectra of tagged substrates according to the present invention.

The scope and interest of the present invention will be better understood based on the following figures and examples which are intended to illustrate certain embodiments of the present invention and are non-limitative.

EXAMPLES

Figure 1:
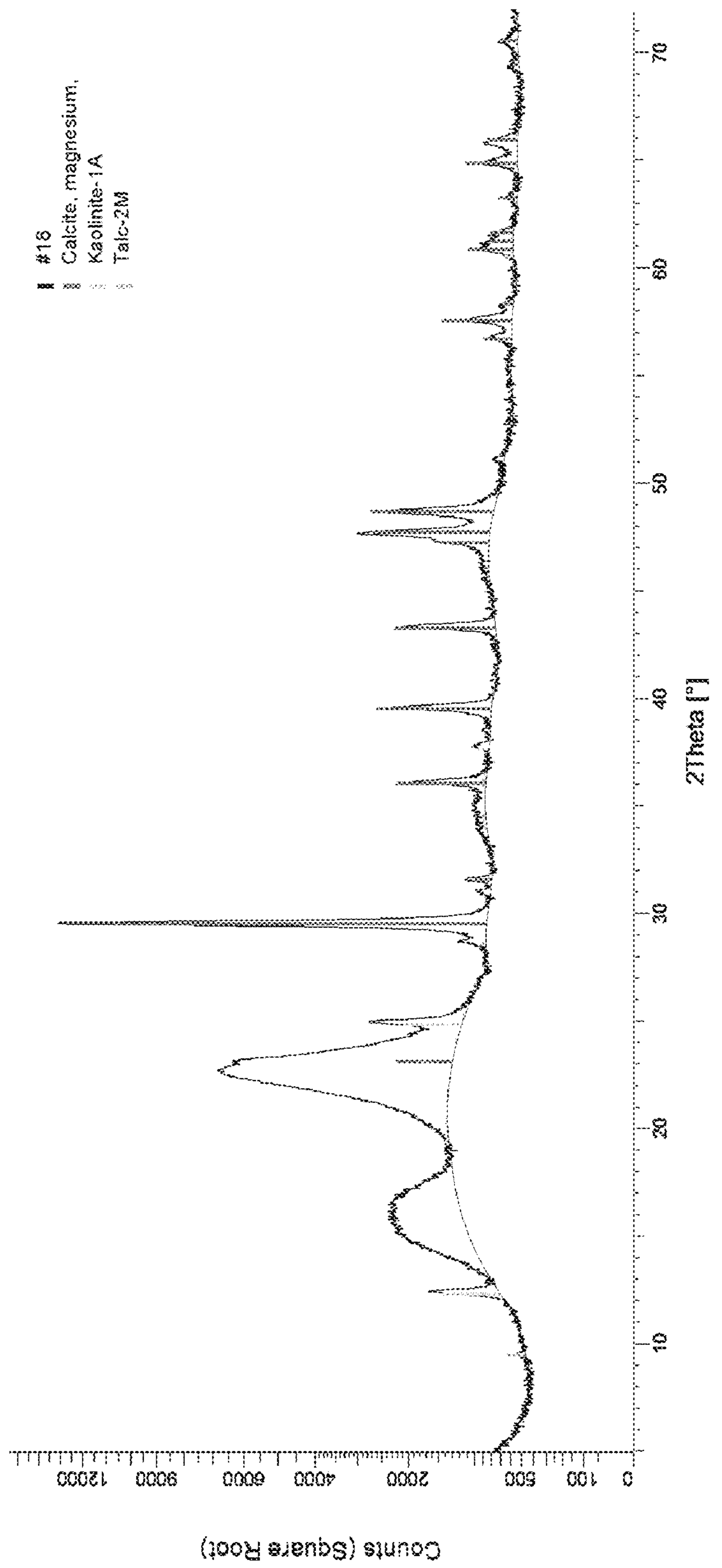
FIGS. 1 to 5 show X-ray diffractograms of comparative substrates.
Figure 2:
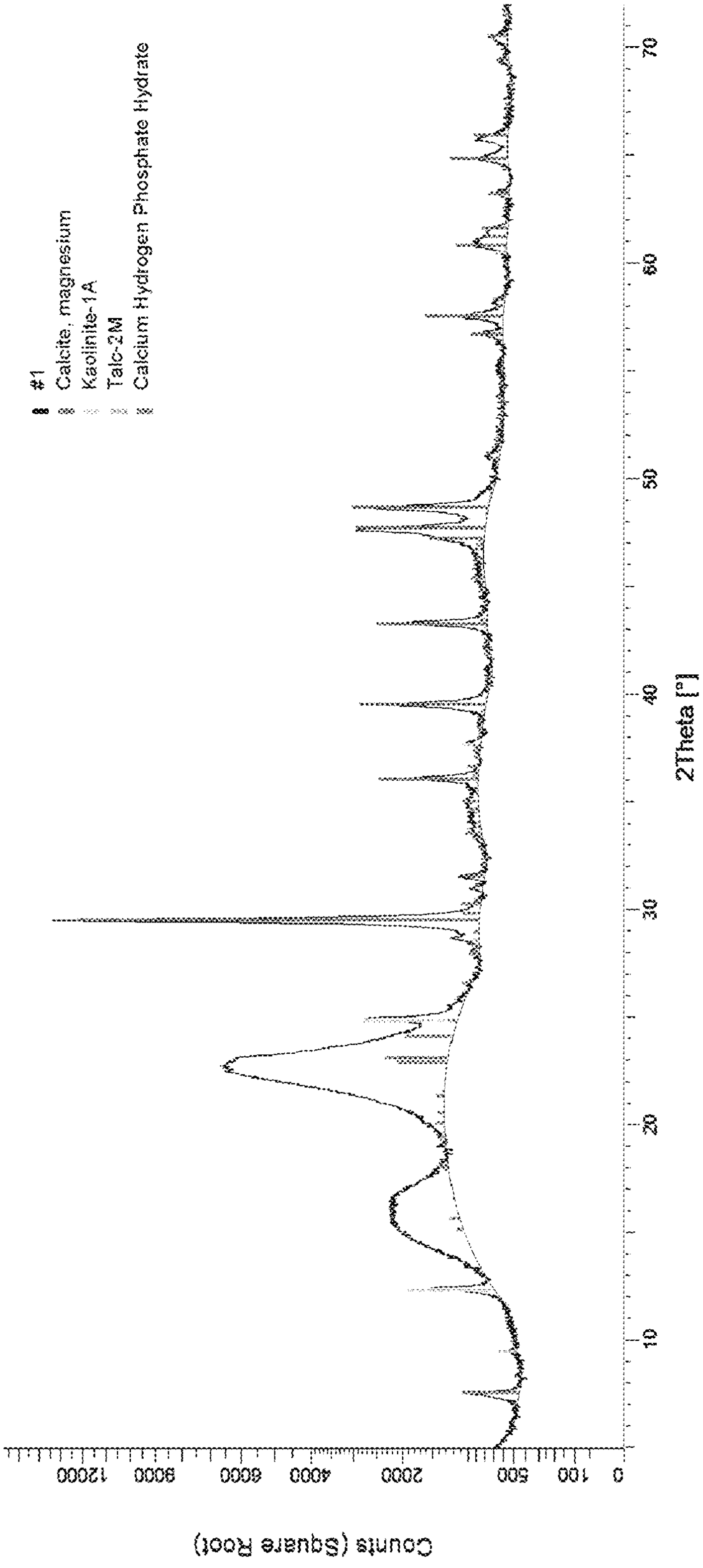
Figure 3:
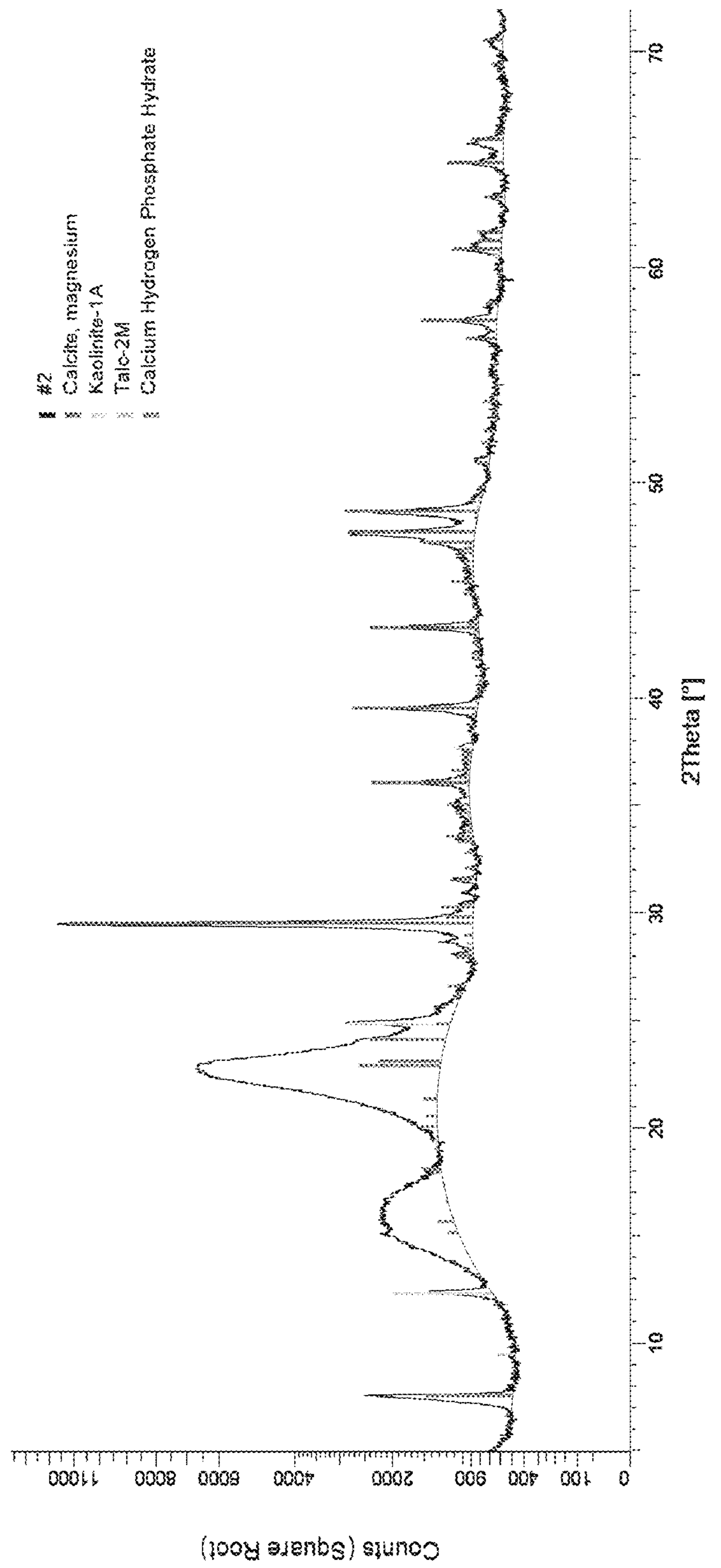
Figure 4:
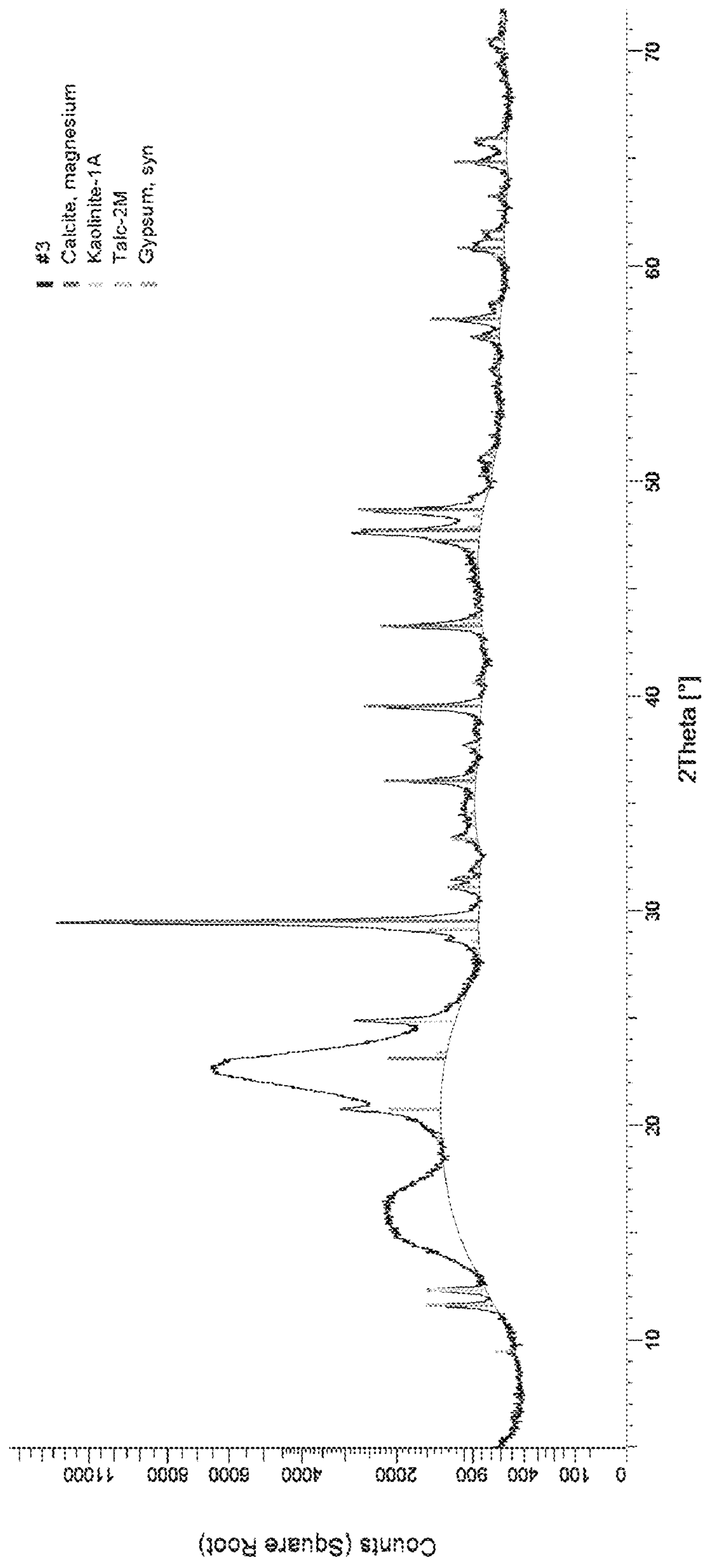
Figure 5:
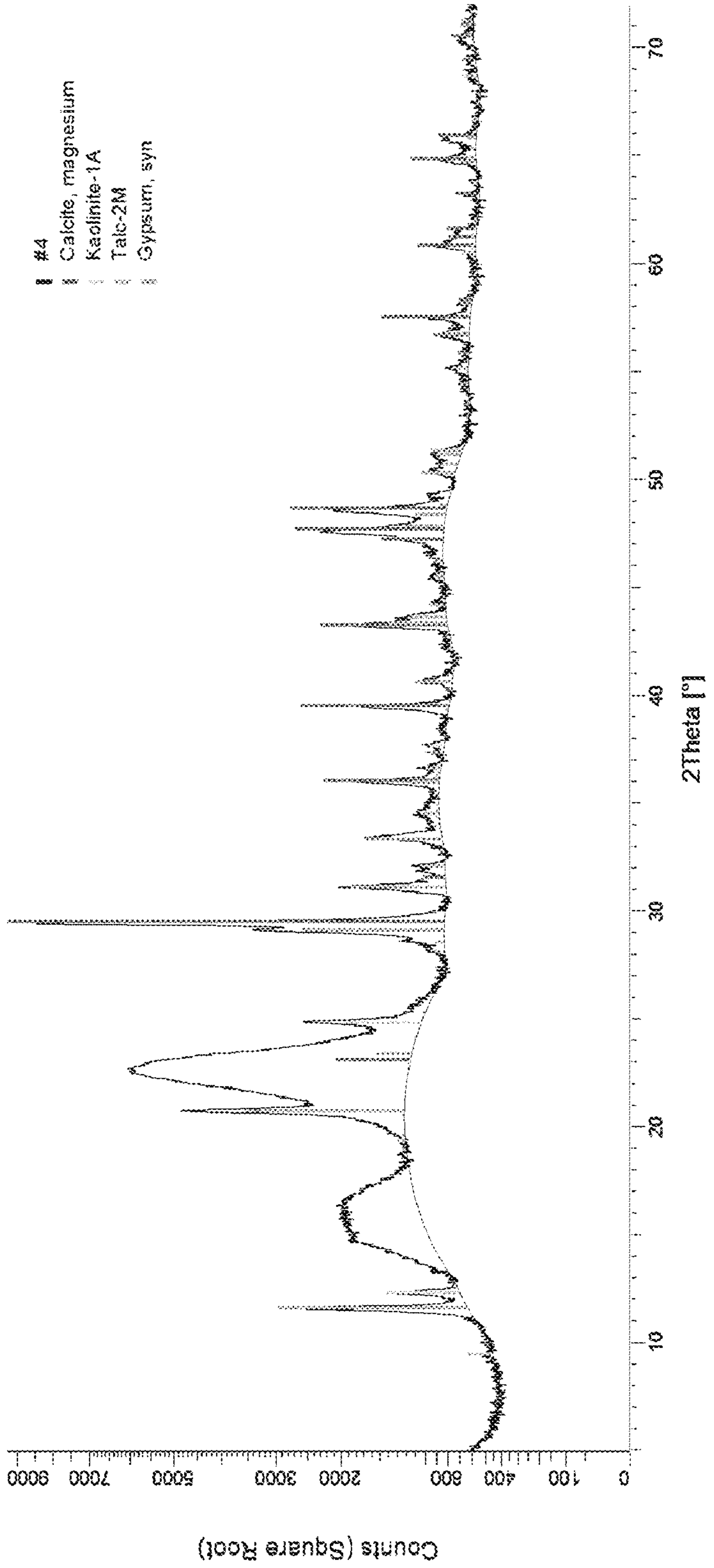
Figure 6:
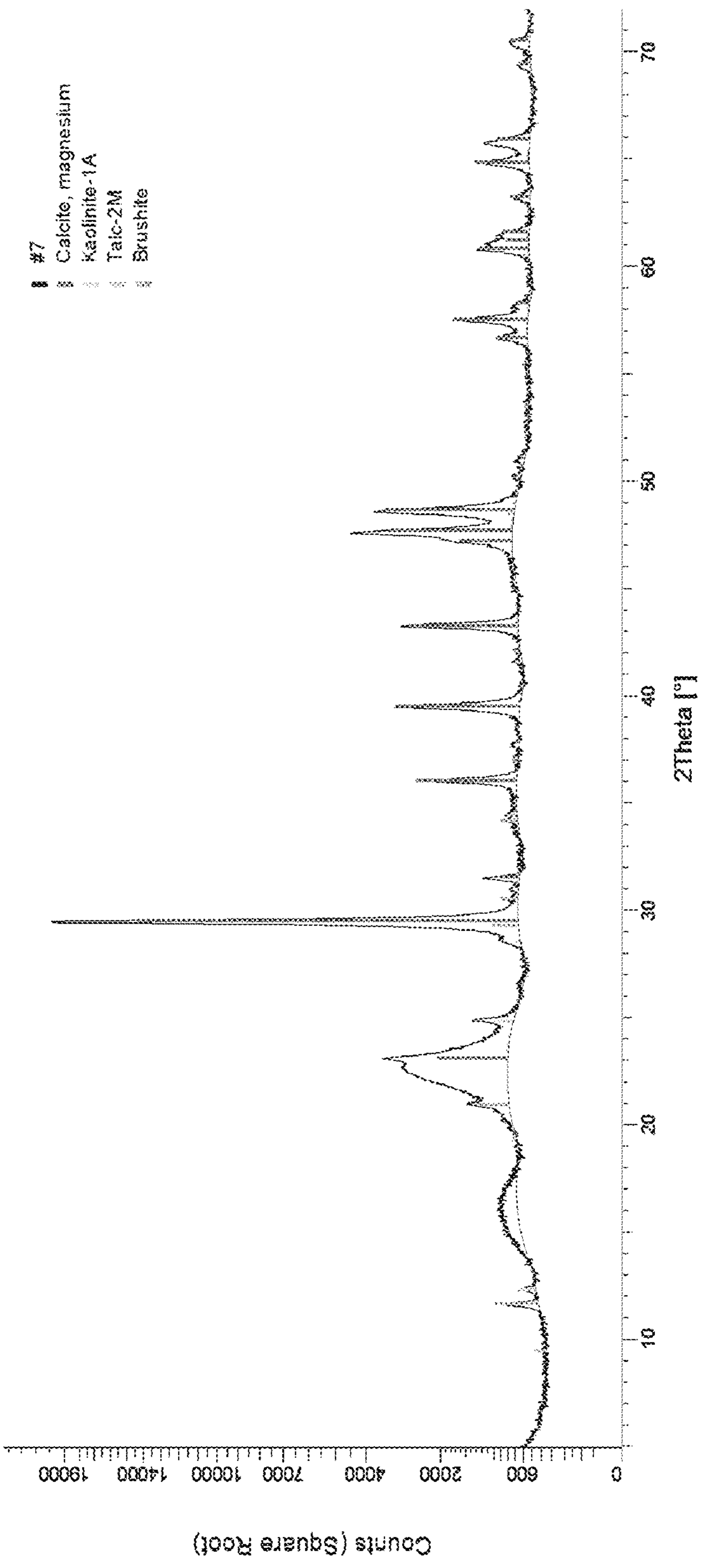
FIGS. 6 to 13 show X-ray diffractograms of tagged substrates according to the present invention.
Figure 7:
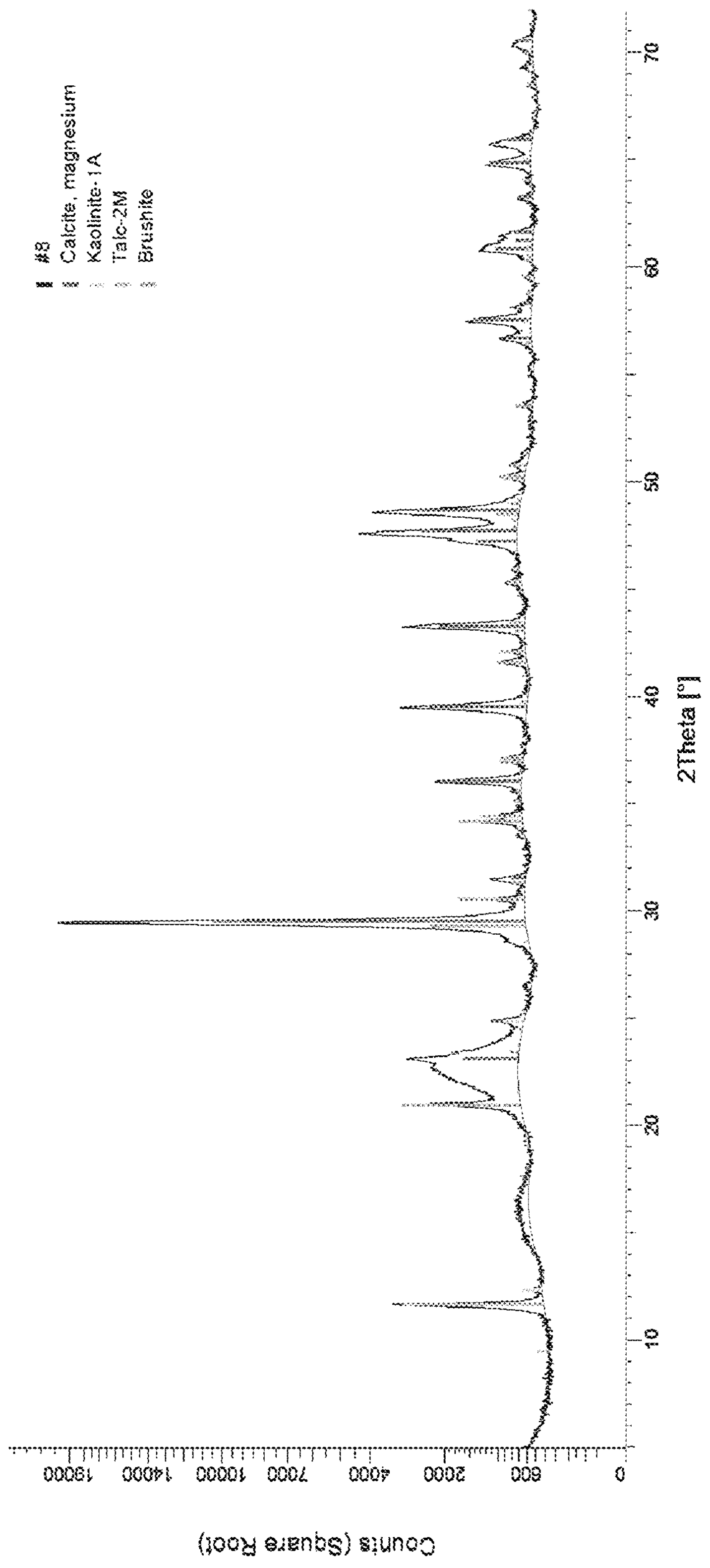
Figure 8:
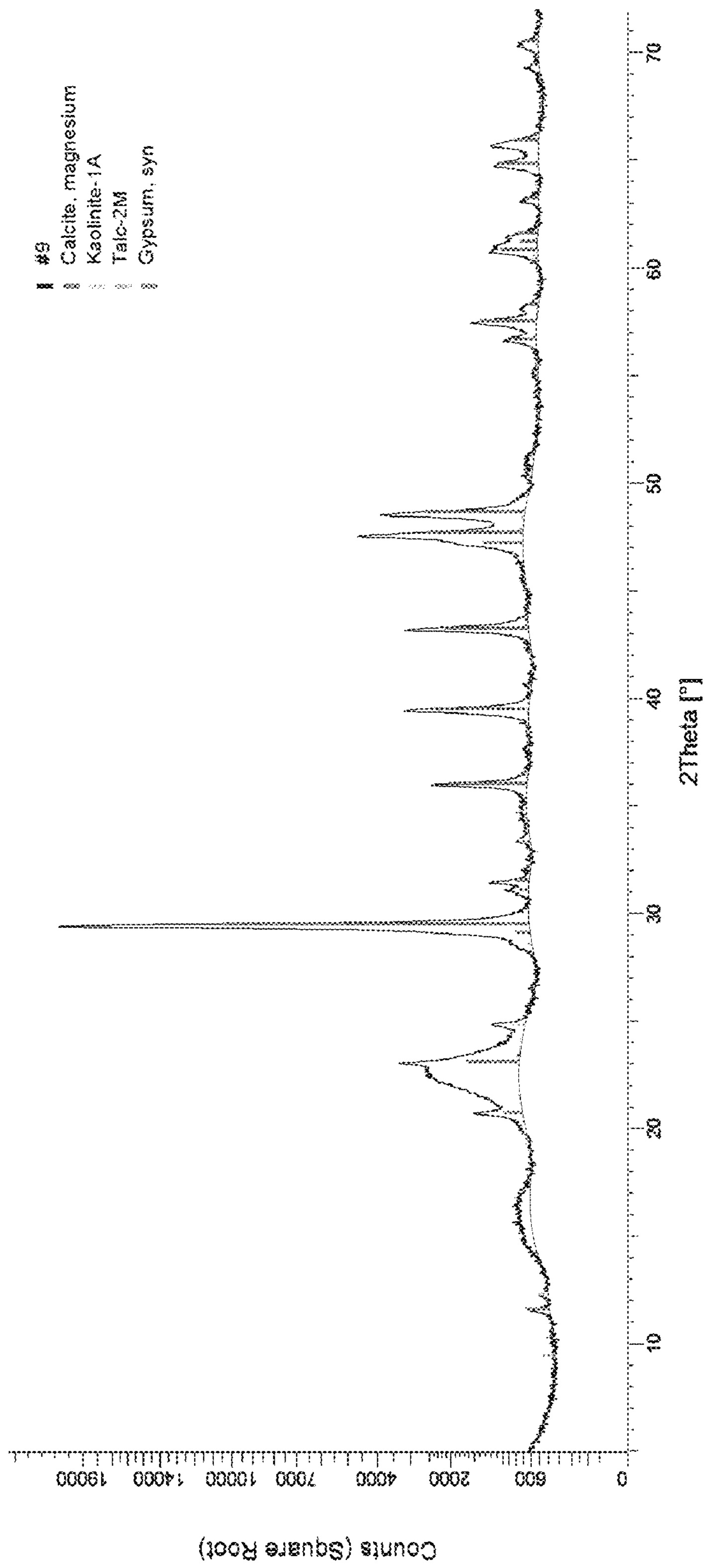
Figure 9:
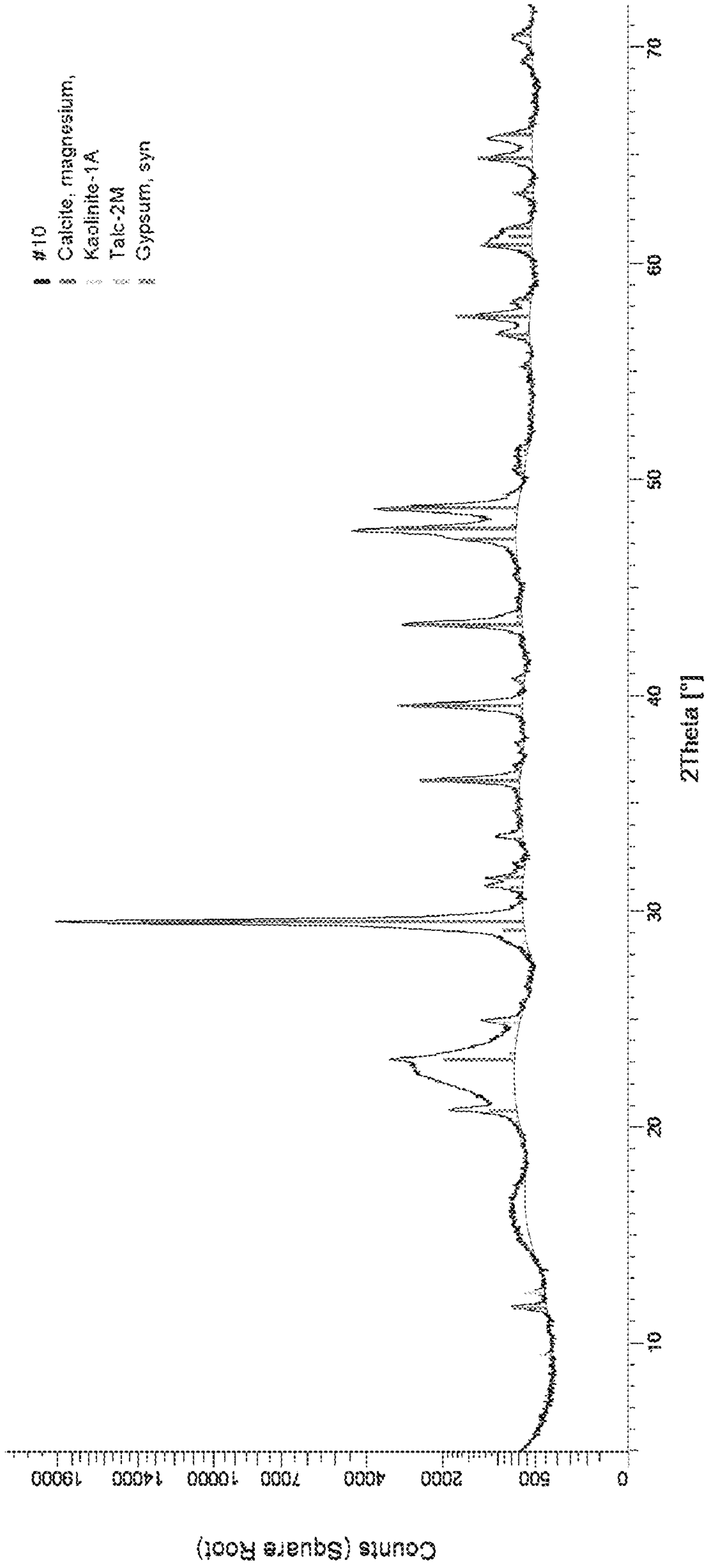
Figure 10:
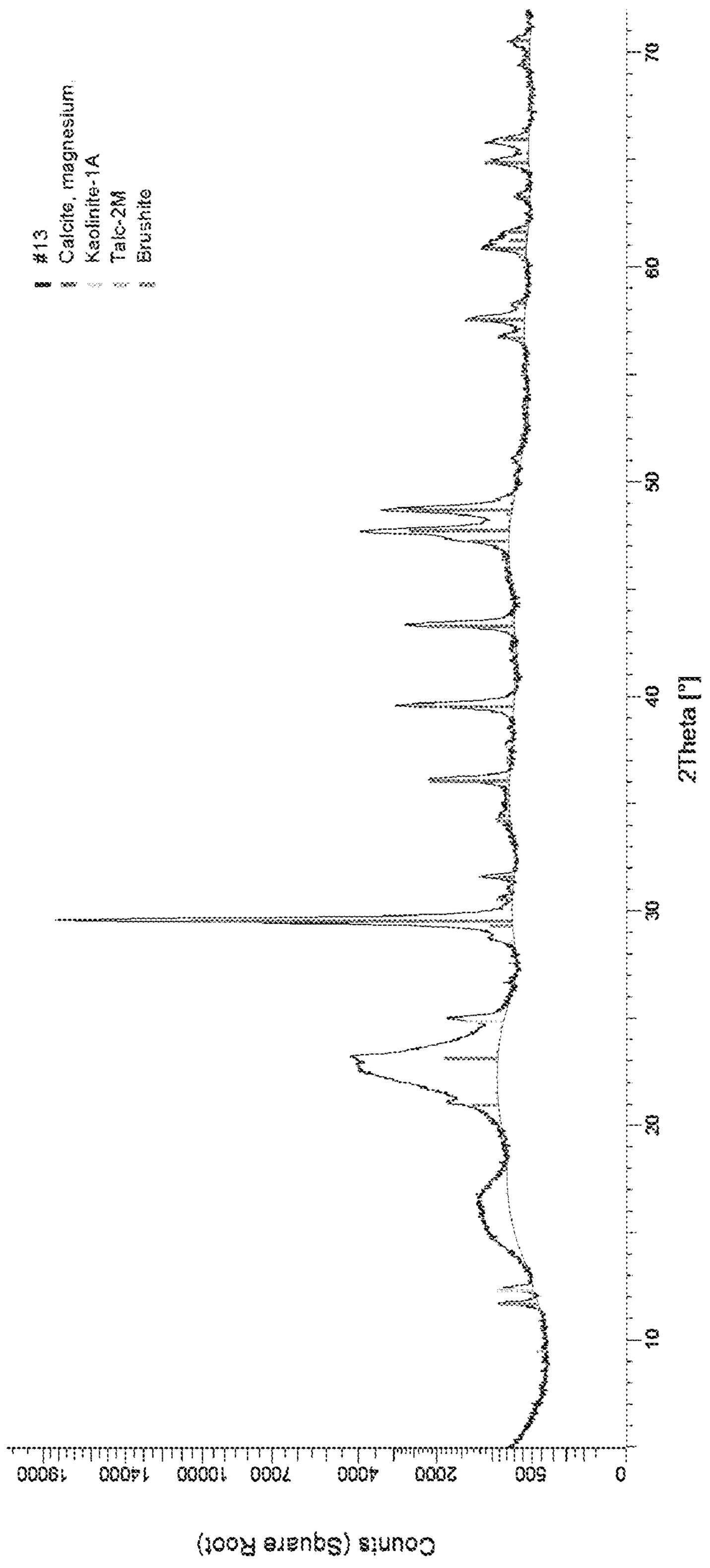
Figure 11:
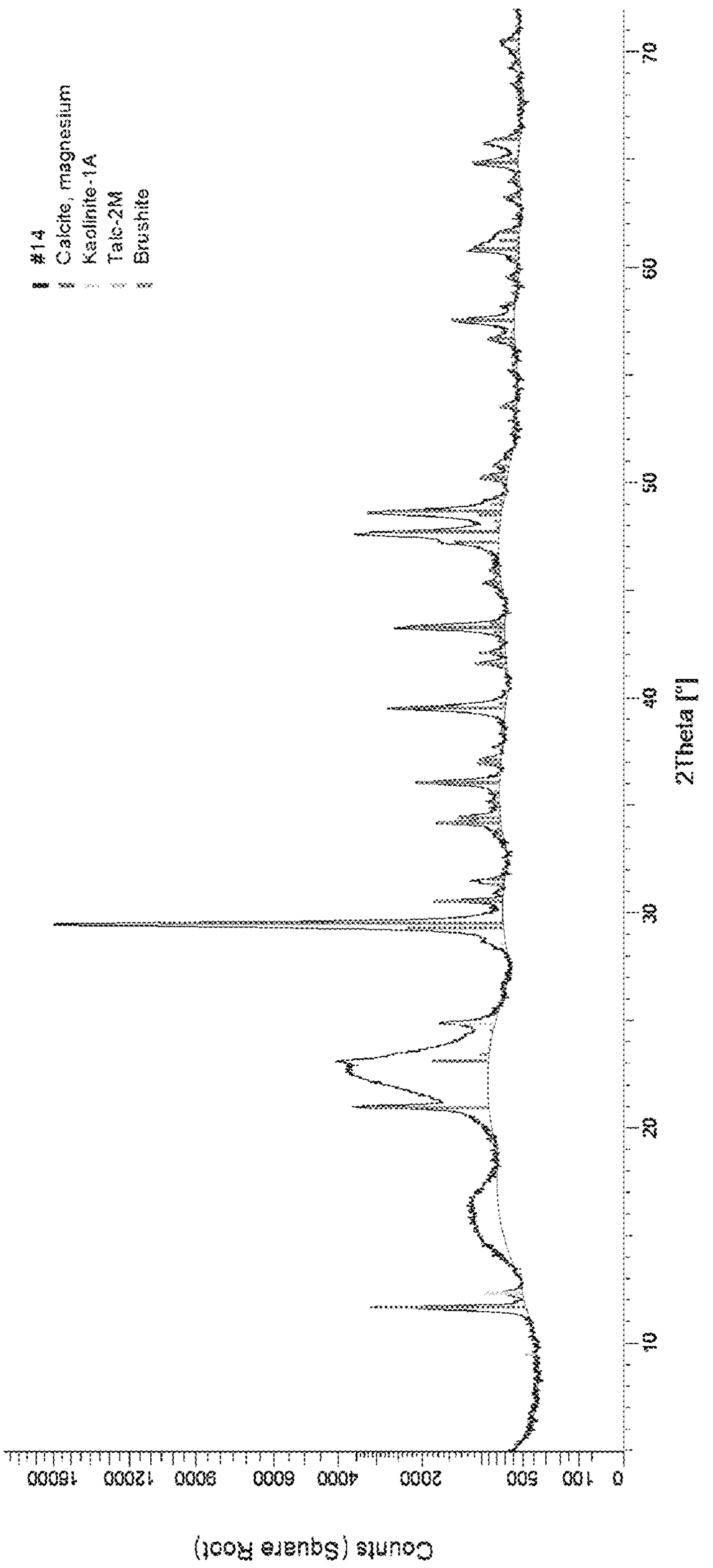
Figure 12:
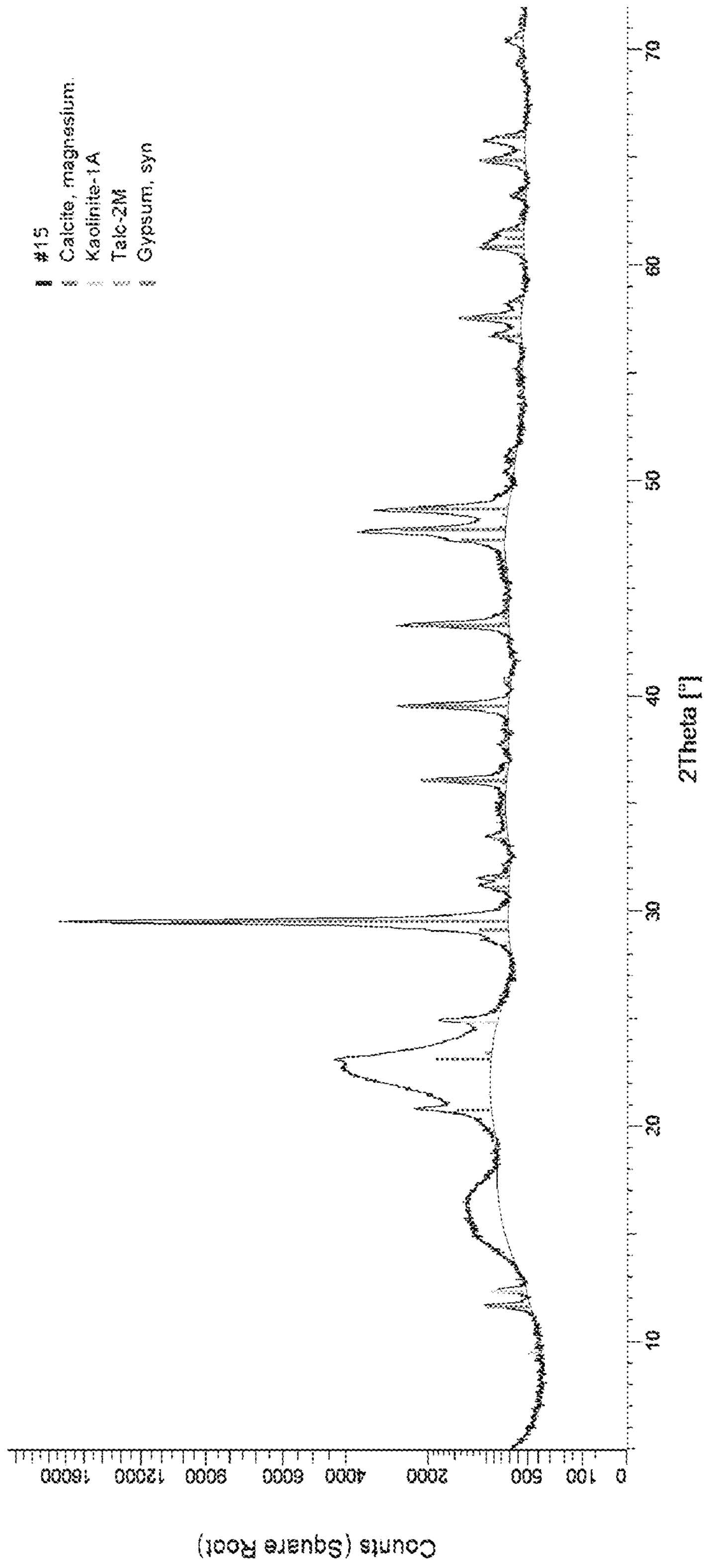
Figure 13:
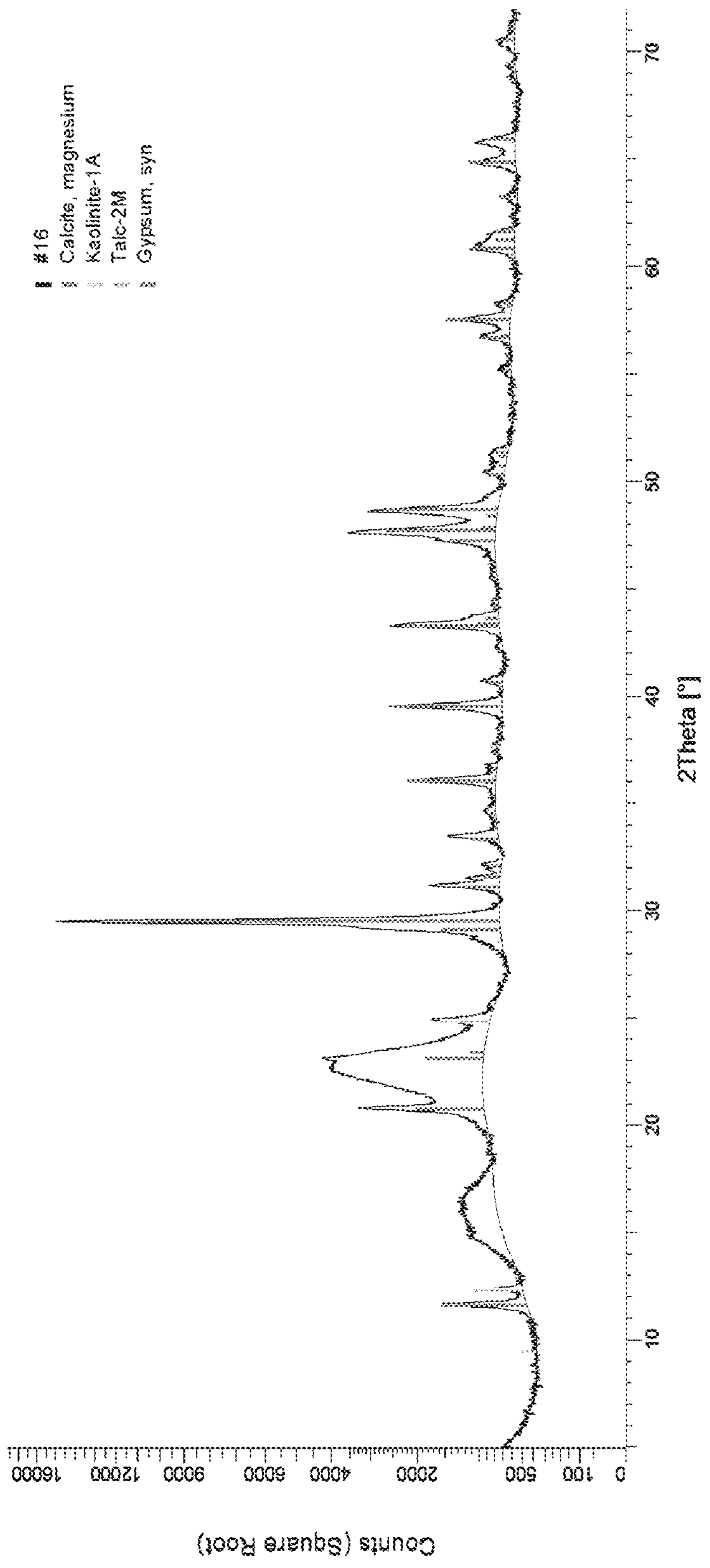
Figure 14:
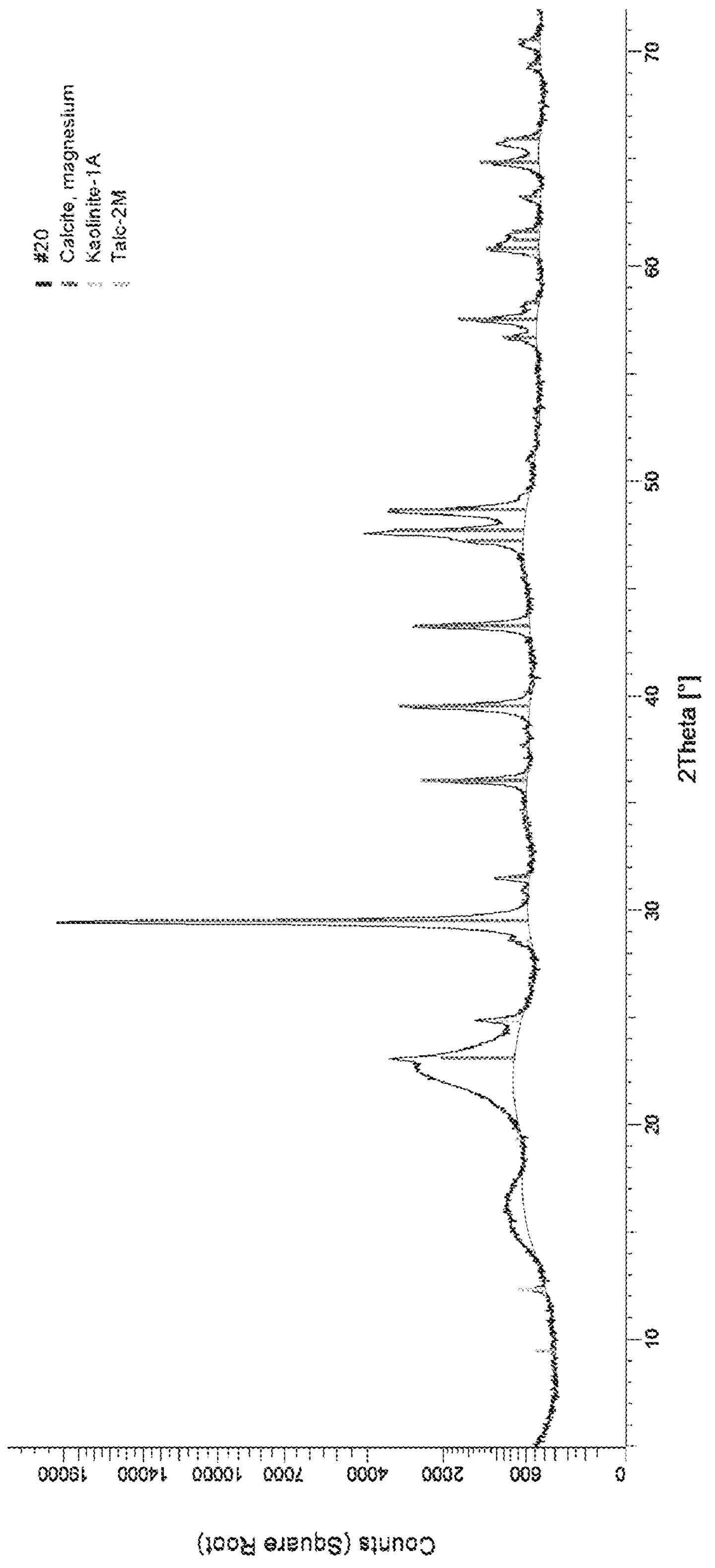
FIGS. 14 and 15 show X-ray diffractrograms of comparative substrates.
Figure 15:
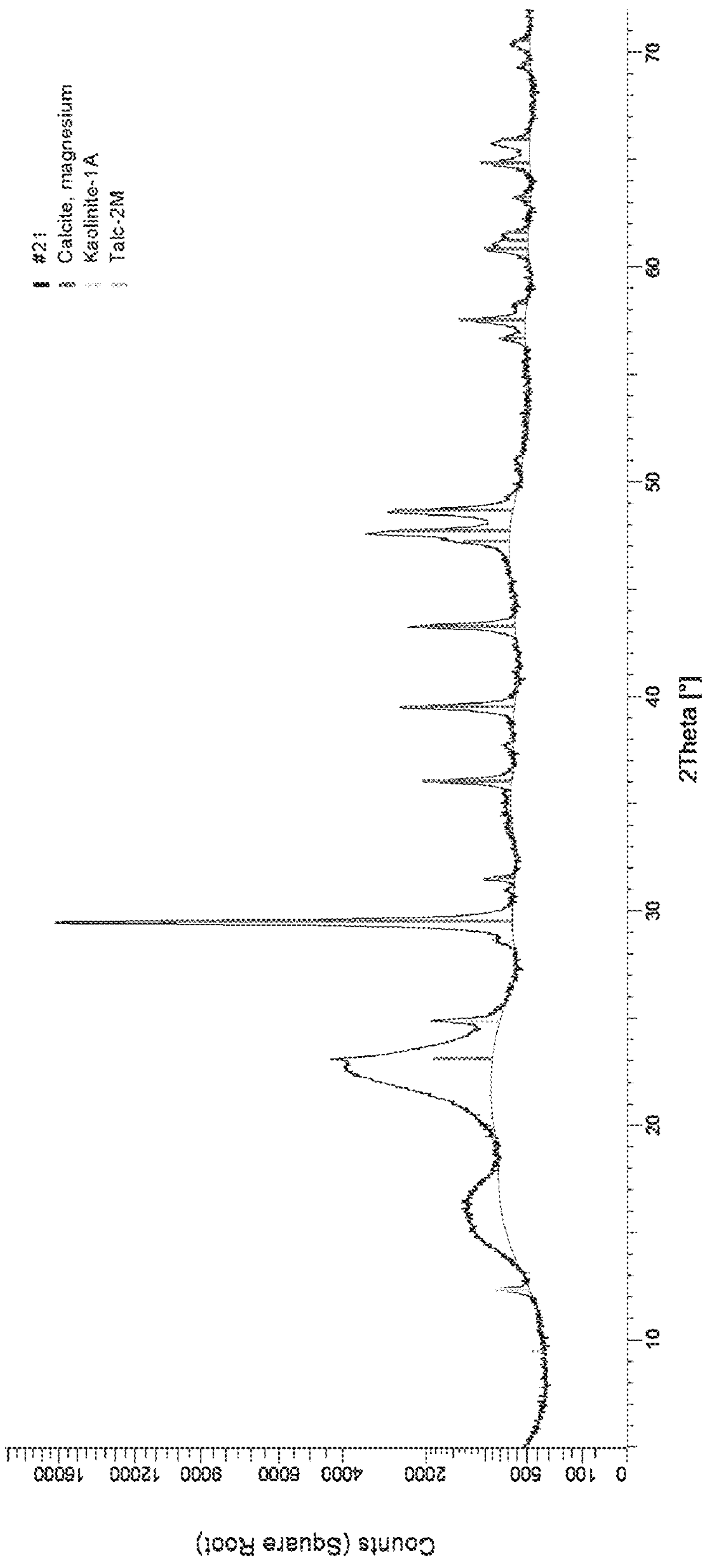

In the following, measurement methods implemented in the examples are described.

1. Methods

Scanning Electron Microscope (SEM) Micrographs

The prepared samples were examined by a Sigma VP field emission scanning electron microscope (Carl Zeiss AG, Germany) and a variable pressure secondary electron detector (VPSE) with a chamber pressure of about 50 Pa.

X-Ray Diffraction (XRD) Analysis

The prepared samples were analysed with a Bruker D8 Advance powder diffractometer obeying Bragg's law. This diffractometer consisted of a 2.2 kW X-ray tube, a sample holder, a $\vartheta$-$\vartheta$ goniometer, and a VÅNTEC-1 detector. Nickel-filtered Cu K$\alpha$ radiation was employed in all experiments. The profiles were chart recorded automatically using a scan speed of 0.7° per minute in 2$\vartheta$ (XRD GV_7600). The resulting powder diffraction pattern was classified by mineral content using the DIFFRAC$^{suite}$ software packages EVA and SEARCH, based on reference patterns of the ICDD PDF 2 database (XRD LTM_7603).

Quantitative analysis of the diffraction data, i.e. the determination of amounts of different phases in a multi-phase sample, has been performed using the DIFFRAC$^{suite}$ software package TOPAS (XRD LTM_7604). This involved modelling the full diffraction pattern (Rietveld approach) such that the calculated pattern(s) duplicated the experimental one.

Semi-Quantitative (SQ) calculations to estimate the rough mineral concentrations were carried out with the DIFFRAC$^{suite}$ software package EVA. The semi-quantitative analysis was performed considering the patterns relative heights and $I/I_{cor}$ values ($I/I_{cor}$: ratio between the intensities of the strongest line in the compound of interest and the strongest line of corundum, both measured from a scan made of a 50-50 by weight mixture).

Energy-Dispersive X-Ray (EDS) Analysis

The prepared samples were examined by a Sigma VP field emission scanning electron microscope (Carl Zeiss AG, Germany). The backscattered electron images were recorded in COMPO-Mode with a chamber pressure of about 50 Pa in order to visualize differences in the chemical composition of the sample. The heavier the atomic weight of the elements present, the brighter the particle appears in the image.

The energy-dispersive X-ray images were recorded with an Oxford X-Max SDD-detector (Silicon Drift Detector) 50 $mm^2$ (Oxford Instruments PLC, United Kingdom) and chamber pressure about 40-90 Pa (40-60 Pa for surfaces/approx. 90 Pa for cross-sections). Dot-mappings and EDS-analysis were taken with the energy dispersive x-ray detector (EDS). The EDS-detector determines the chemical elements of a sample and can show the position of the elements in the sample.

Fourier-Transform Infrared (FTIR) Analysis

The FTIR spectra of the samples were recorded by a Spectrum One™ FTIR spectrometer, commercially available from PerkinElmer, Inc., USA. The ATR crystal was a 3 bounce diamond/zinc selenide crystal. The scan speed was 0.2 cm/s, the resolution was 4.0 $cm^{-1}$, the range was 4 000 to 550 $cm^{-1}$. 10 scans per spectrum were made. The analysis of the bands was done by comparing to reference material and/or a data library.

2. Materials

Substrate

S1: Commercially available paper, pre-coated with a coating layer containing the pigments calcium carbonate, kaolinite, and talc. An X-ray diffraction spectrum of this paper is shown in FIG. 1 and a quantitative Rietveld analysis can be found in Table 2 (data are presented in % and are normalized to 100% crystalline material).

Figure 30:
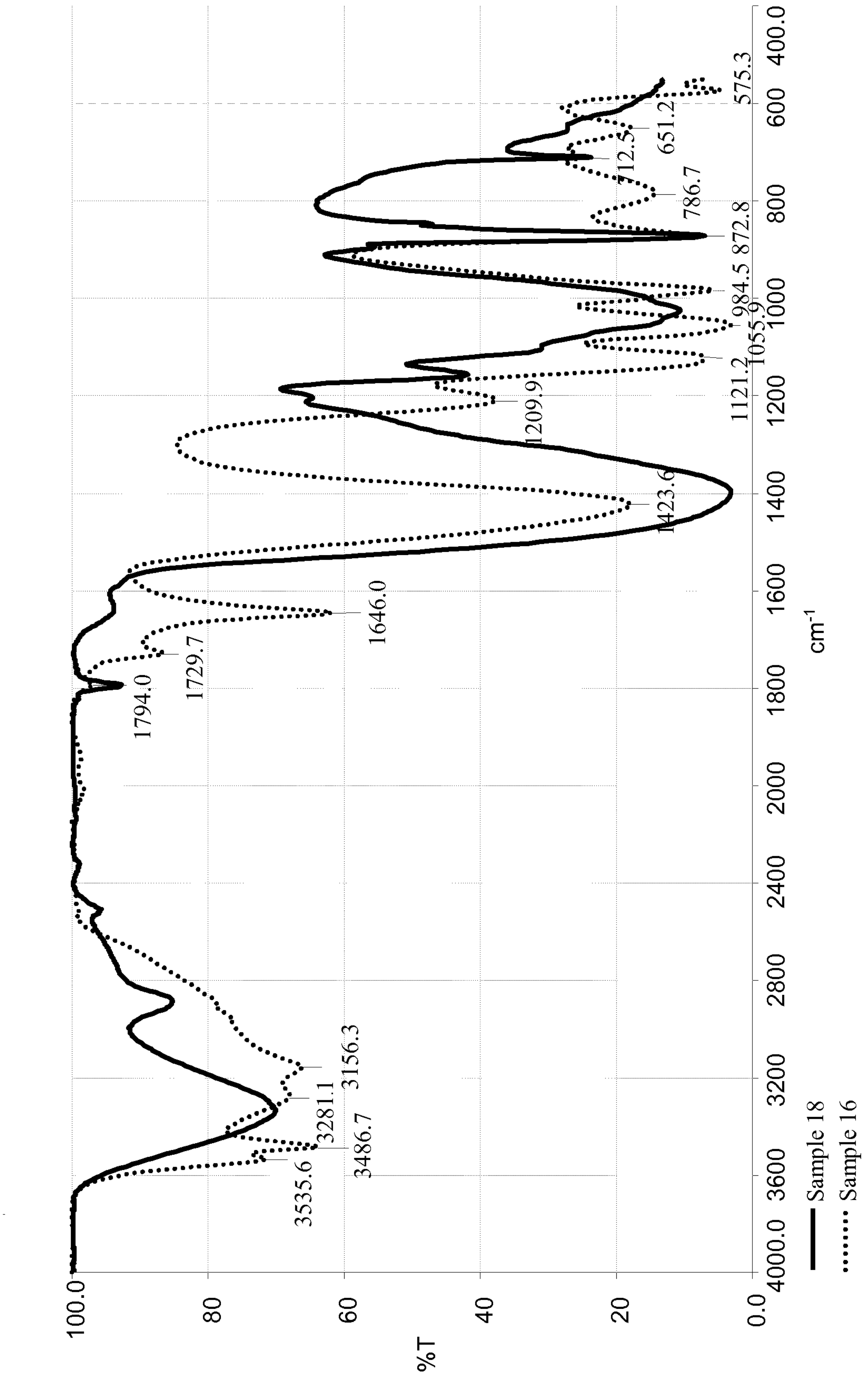
FIG. 30 shows FTIR spectra of a comparative substrate and a tagged substrate according to the present invention.

S2: Commercially available, *eucalyptus* fiber-based, uncoated paper having a basis weight of 90 $g/m^2$ and containing 36 wt.-% calcium carbonate as filler (based on total dry paper weight) and a minor amount optical brightener. A FTIR spectrum of said paper is shown in FIG. 30 (sample 18).

Pigment

Ground calcium carbonate ($d_{50}$: 0.7 μm, $d_{98}$: 5 μm), pre-dispersed slurry with solids content of 78%, commercially available from Omya AG, Switzerland, under the tradename Hydrocarb 90.

Binder

Styrene-acrylate latex (Acronal S728), commercially available from BASF, Germany.

Liquid Treatment Compositions

L1: 33.3 vol.-% phosphoric acid (85%), 33.3 vol.-% ethanol (95%, technical grade), and 33.4 vol.-% water (vol.-% are based on the total volume of the liquid treatment composition).

L2: 16.7 vol.-% sulphuric acid (95-98%), 16.7 vol.-% ethanol (95%, technical grade), 66.6 vol.-% water (vol.-% are based on the total weight of the liquid treatment composition).

3. Examples

3.1. Example 1

Tagged substrates were produced by applying one of the liquid treatment compositions L1 and L2 onto substrate S1. This was done by applying the treatment composition continuously onto the substrate S1 at room temperature within a distance from the external surface of about 15 cm, using an air brush attached to the in-house pressure line. The air brush was operated at a pressure of 2 bar. The type and amount of applied liquid treatment composition is indicated in Table 1 below. After the liquid treatment composition has dried, the obtained surface-modified region was over-coated with an opaque top layer formulation comprising the pigment and the binder mentioned above. The coating was carried out with laboratory tabletop rod coater (K202 Control Coater, RK PrintCoat Instruments Ltd., United Kingdom). The composition of the coating formulation was 100 pph pigment and 8 pph binder, wherein the "pph" values are weight based. For a coat weight of 14 $g/m^2$, the solids content of the coating formulation was 65 wt.-%, based on the total weight of the coating formulation, and for a coat weight of 7 $g/m^2$, the solids content was 42 wt.-%, based on the total weight of the coating formulation. The prepared samples were dried under hot air at 150° C. after coating.

The obtained opaque top layer had a white colour and a final binder concentration of 8 wt.-%, based on the total weight of pigment. The layer weights of the produced top layers are indicated in Table 1 below.

In addition, comparative samples without a surface modification and with or without an opaque top layer have been prepared. The prepared tagged substrates and comparative substrates are listed in Table 1 below.

TABLE 1

Prepared tagged substrates and comparative substrates.

| Sample | liquid treatment composition | Applied amount of liquid treatment composition [ml/$m^2$] | coat weight top layer [g/$m^2$] |
|---|---|---|---|
| 1 (comparative) | — | — | — |
| 2 (comparative) | L1 | 2 | — |
| 3 (comparative) | L1 | 6 | — |
| 4 (comparative) | L2 | 2 | — |
| 5 (comparative) | L2 | 6 | — |
| 6 | L1 | 2 | 14 |
| 7 | L1 | 6 | 14 |
| 8 | L2 | 2 | 14 |
| 9 | L2 | 6 | 14 |
| 10 | L1 | 2 | 7 |
| 11 | L1 | 6 | 7 |
| 12 | L2 | 2 | 7 |
| 13 | L2 | 6 | 7 |
| 14 (comparative) | — | — | 14 |
| 15 (comparative) | — | — | 7 |

The obtained tagged substrates and comparative substrates were analysed by X-ray diffractometry, energy-dispersive X-ray spectroscopy, FTIR spectroscopy, and laser ablation inductively coupled plasma mass spectrometry (LA-ICP-MS).

Results of X-Ray Diffractometry

FIGS. 1 to 15 show X-ray diffraction spectra and qualitative phase analysis of the spectra of samples 1 to 15. Comparison of the measured spectra with ICDD reference patterns revealed that all samples consisted of calcite, kaolinite and talc. The treated substrates contained additional phases, which were formed by the application of the liquid treatment compositions. The results are summarized in Table 2 below.

TABLE 2

Results of quantitative Rietveld analysis of the prepared substrate samples. Data are presented in % and are normalized to 100% crystalline material.

| Mineral | Sample 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Calcite $CaCO_3$ | 76 | 40 | 29 | 79 | 34 | 80 | 66 | 79 | 70 | 79 | 58 | 70 | 53 | 90 | 87 |
| Kaolinite $Al_2Si_2O_5(OH)_4$ | 17 | 18 | 18 | 8 | 12 | 8 | 7 | 7 | 6 | 9 | 10 | 10 | 7 | 7 | 9 |
| Talc $Mg_3Si_4O_{10}(OH)_2$ | 7 | 5 | 3 | 3 | 5 | 3 | 4 | 2 | 5 | 4 | 5 | 2 | 7 | 3 | 4 |
| Calcium hydrogen phosphate hydrate $Ca(H_2PO_4)2{\bullet}H_2O$ | — | 38 | 50 | — | — | — | — | — | — | — | — | — | — | | |
| Brushite $Ca(HPO_4){\bullet}2H_2O$ | — | — | — | — | — | 9 | 23 | — | — | 8 | 27 | — | — | | |
| Gypsum $CaSO_4$ | — | — | — | 10 | 49 | — | — | 12 | 19 | — | — | 18 | 33 | | |

Results of Energy-Dispersive X-Ray (EDS) Spectroscopy

Figure 16:
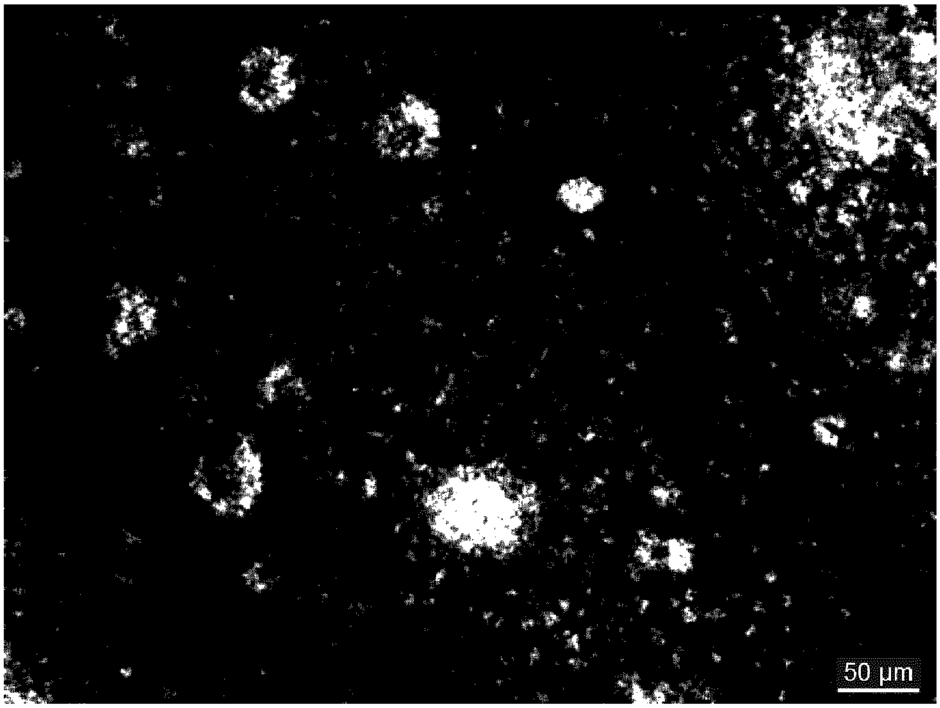
FIG. 16 shows an SEM/EDS analysis of a tagged substrate according to the present invention.
Figure 17:
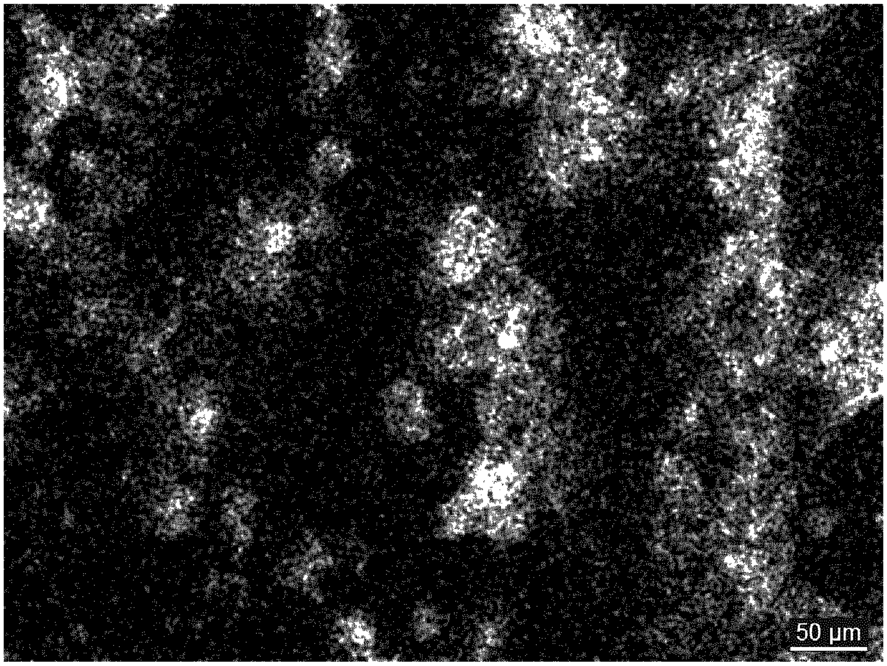
FIG. 17 shows an SEM/EDS analysis of a tagged substrate according to the present invention.
Figure 18:
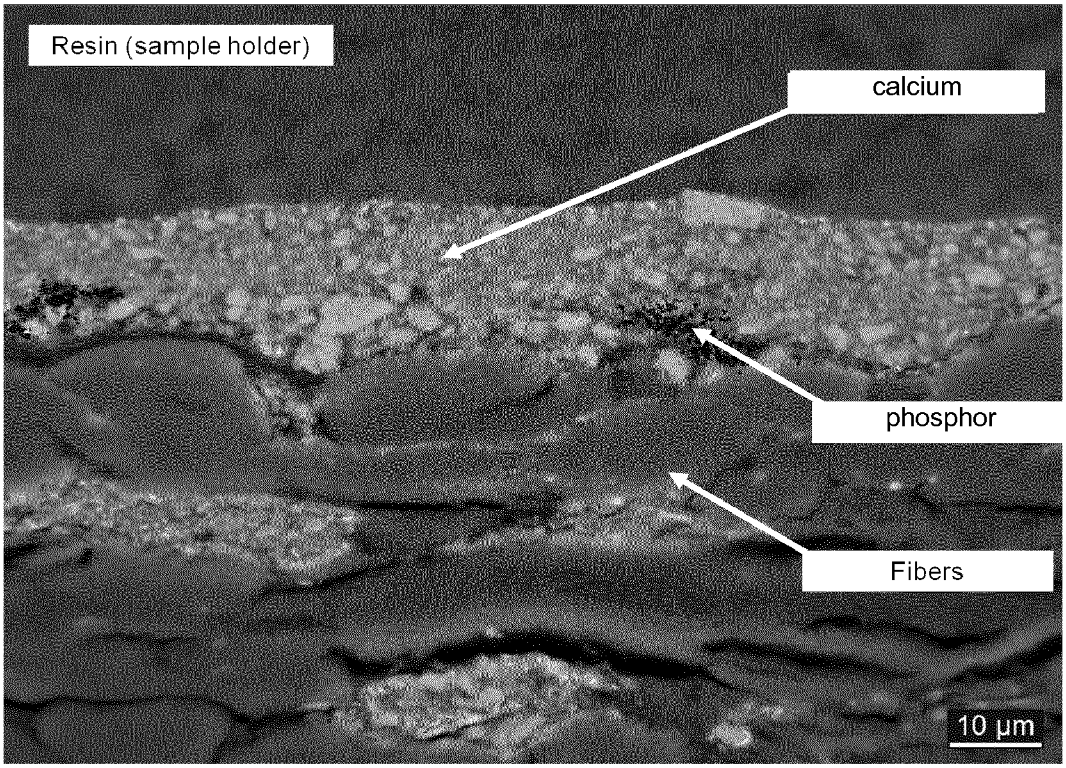
FIG. 18 shows an SEM/EDS micrograph of a cross-section of a tagged substrate according to the present invention.
Figure 19:
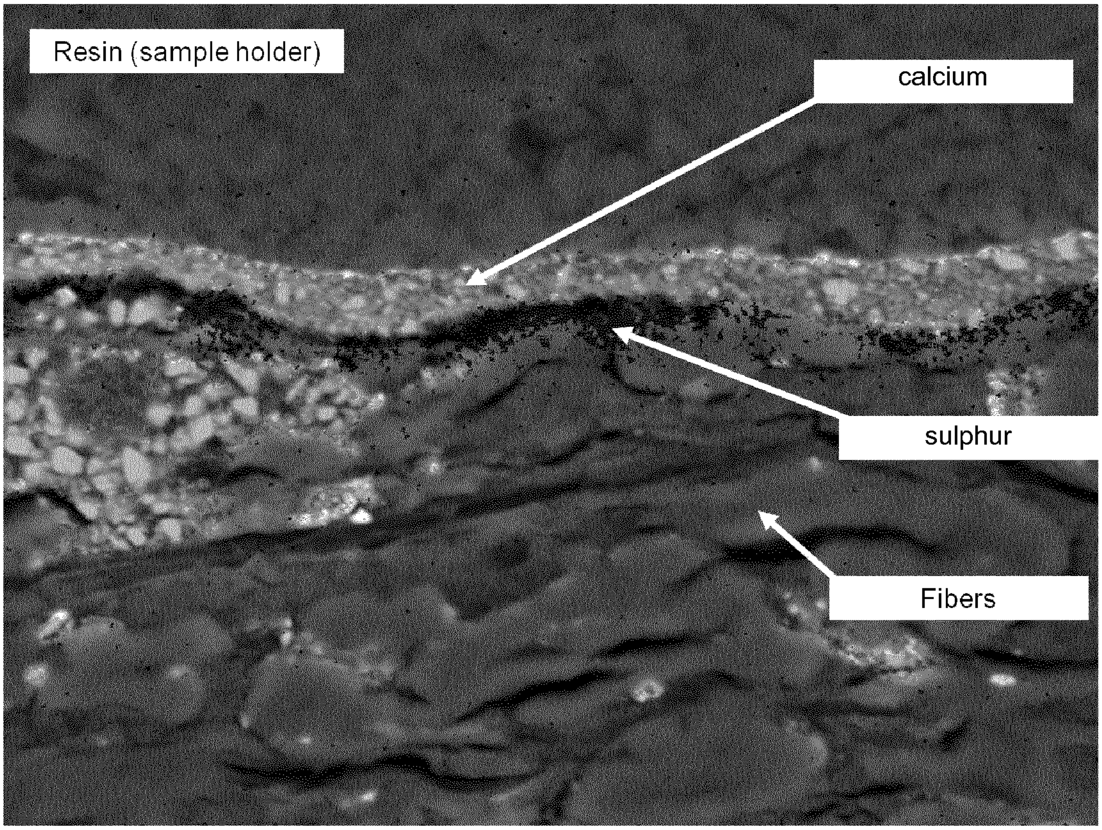
FIG. 19 shows an SEM/EDS micrograph of a cross-section of a tagged substrate according to the present invention.

The results of the EDS analysis confirmed that all samples consisted of calcite, kaolinite and talc. Additional phases, which were formed by the application of the liquid treatment compositions, could be detected for the treated substrates. A map of the crystal phosphor-containing phases of sample 10 is shown in FIG. 16, wherein the phosphor-containing phases are highlighted in white. FIG. 17 shows a map of the crystal sulphur-containing phases of sample 15, wherein the sulphur-containing phases are highlighted in white. SEM pictures showing cross-sections of samples 10 and 15 are shown in FIGS. 18 and 19.

Results of FTIR Spectroscopy

The analysis of the measured FTIR spectra revealed that the samples which were treated with the liquid treatment compositions show characteristic phosphate or sulphate bands, respectively.

Figure 20:
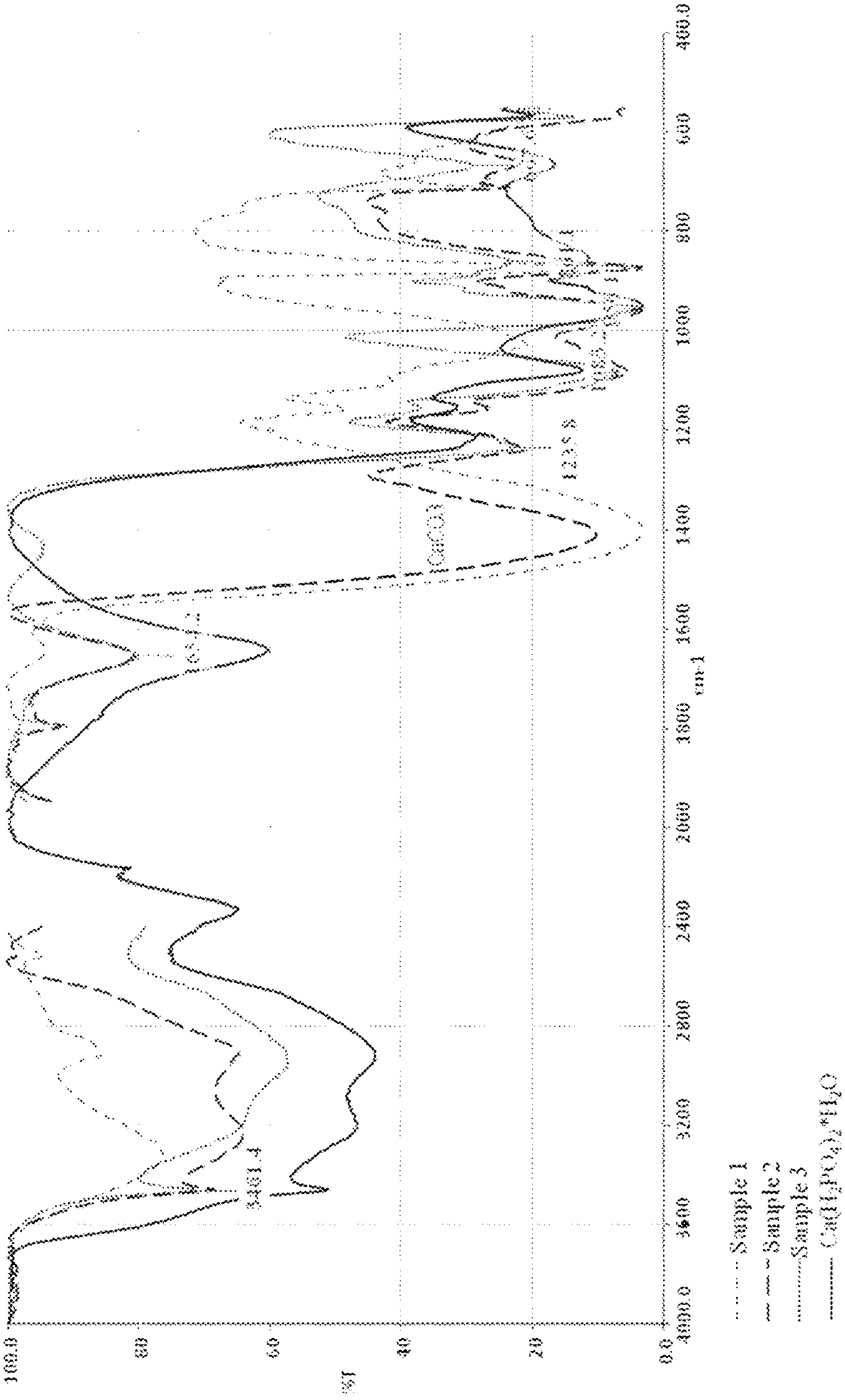
FIGS. 20 to 24 show FTIR spectra of comparative substrates and tagged substrates according to the present invention.

As can be gathered from the FTIR spectra of comparative samples 1, 2, and 3 shown in FIG. 20, the dihydrogenphosphate bands are clearly visible in samples 2, and 3, which were treated with the liquid treatment composition L1 containing phosphoric acid. The bands were identified on the basis of a reference spectrum of $Ca(H_2PO_4)_2.H_2O$, which is also shown in FIG. 20.

Figure 21:
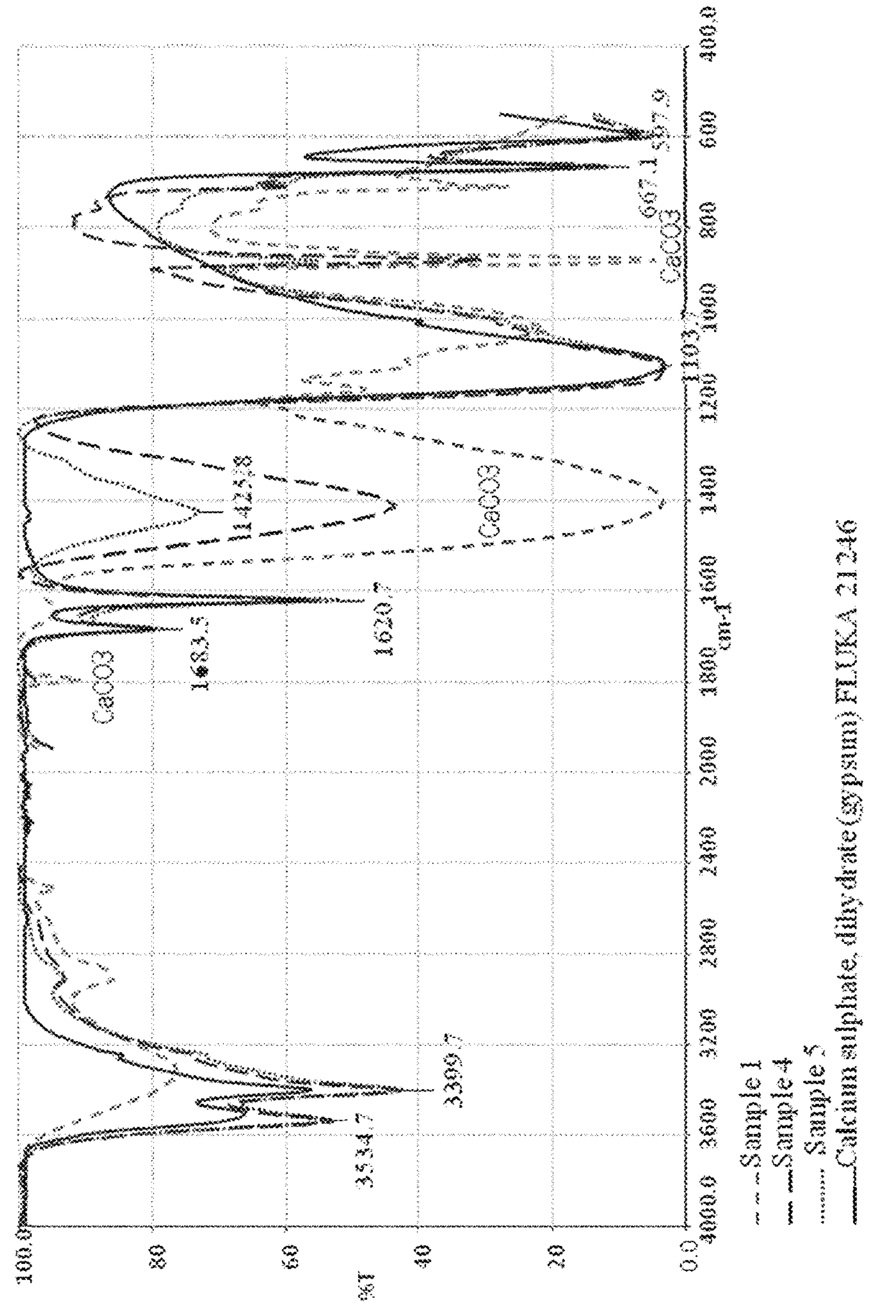

FIG. 21 shows the FTIR spectra of comparative samples 1, 4, and 5. The gypsum bands are clearly visible in samples 4, and 5, which were treated with the liquid treatment composition L2 containing sulphuric acid. The bands were identified on the basis of a reference spectrum of calcium sulphate dihydrate, which is also shown in FIG. 21.

Figure 22:
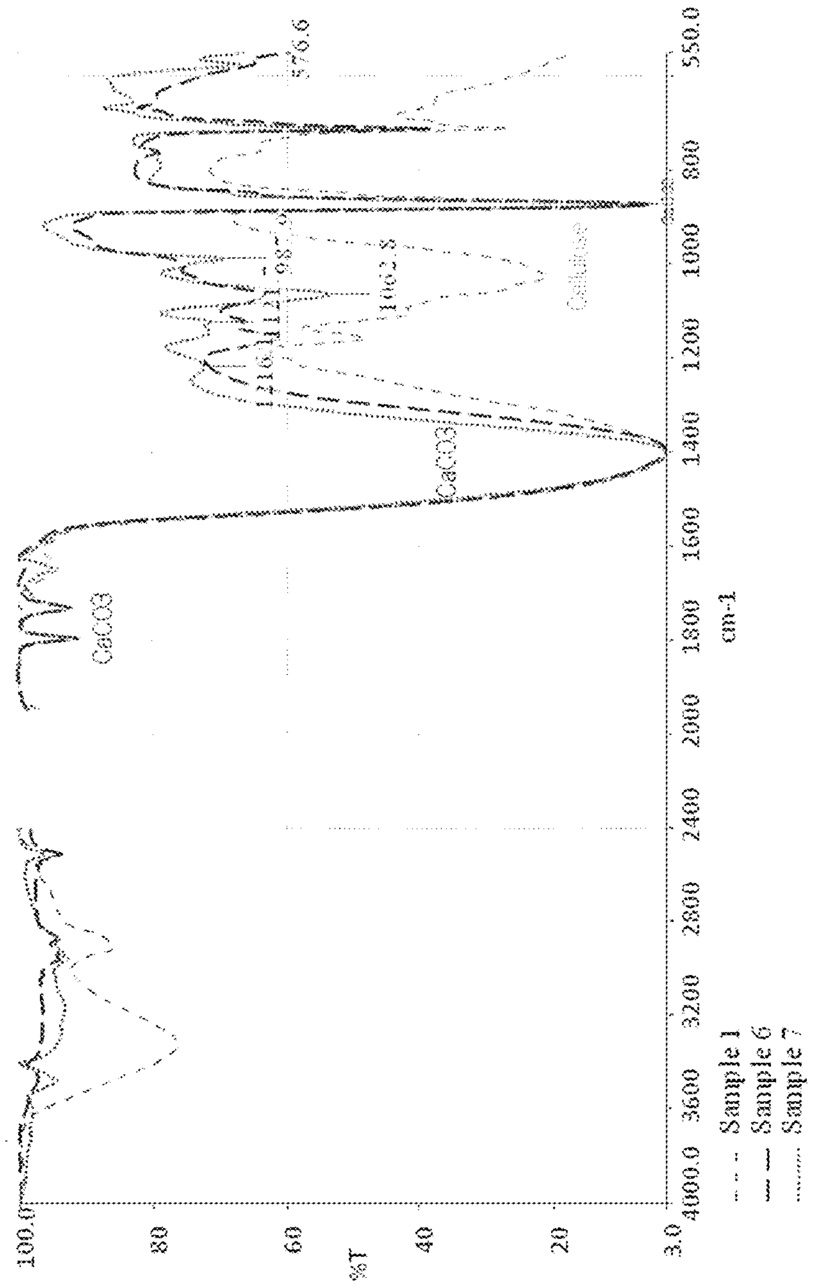
Figure 23:
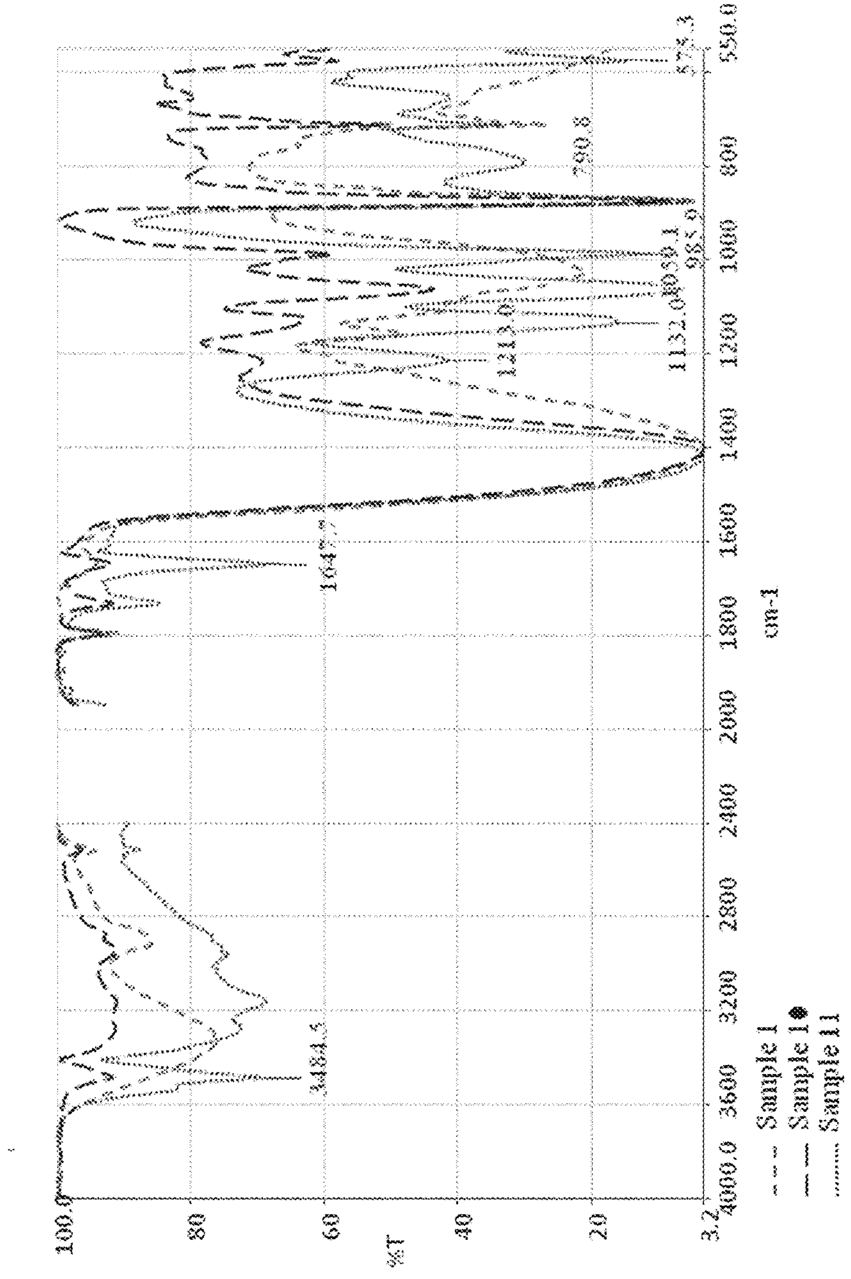
Figure 24:
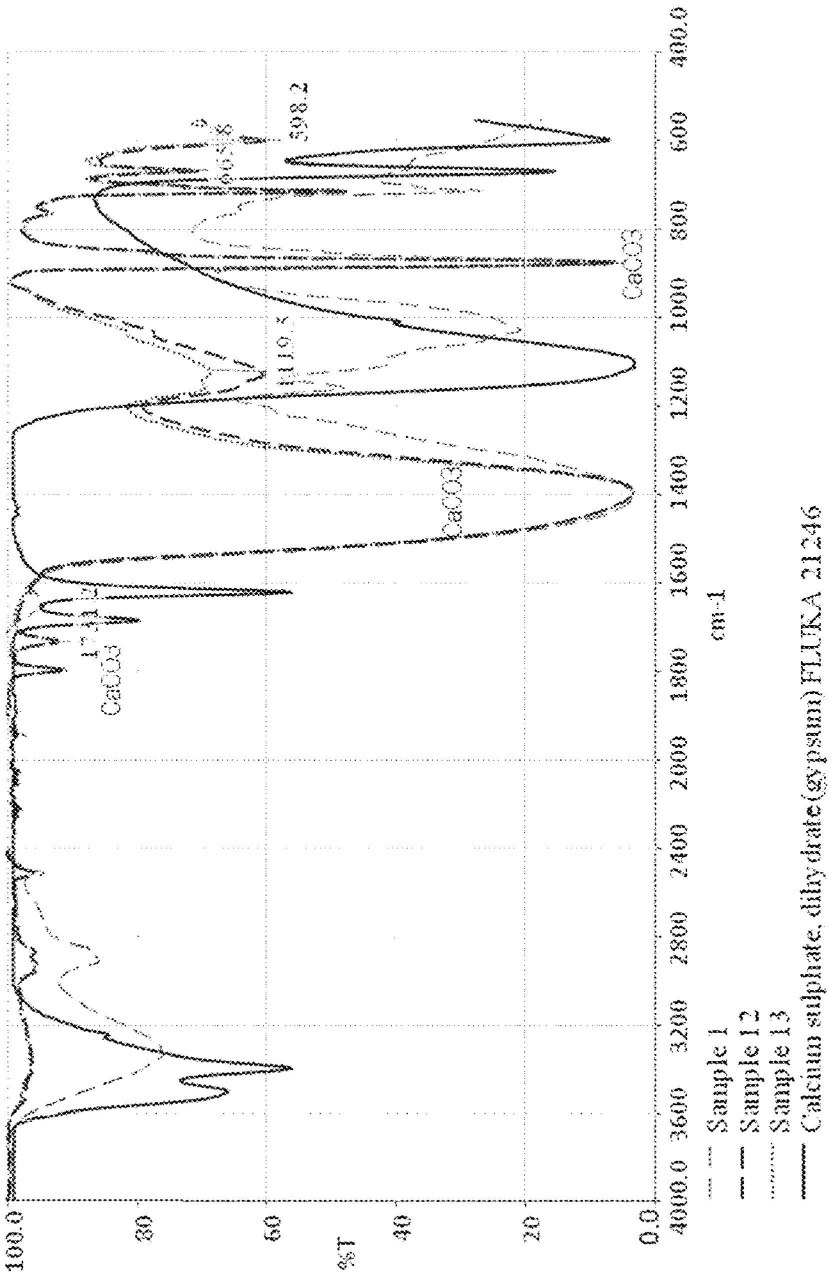

FIG. 22 shows the FTIR spectra of comparative sample 1, and inventive samples 6 and 7. The inventive samples show medium to weak phosphate bands between 1 250 and 950 $cm^{-1}$. FIG. 23 shows the FTIR spectra of comparative sample 1, and inventive samples 10 and 11. The inventive samples show medium to weak phosphate bands between 1 650 and 950 $cm^{-1}$. FIG. 24 shows the FTIR spectra of comparative sample 1, and inventive samples 15 and 16. The inventive samples show characteristic gypsum bands at 1 119.5 $cm^{-1}$ (the main gypsum bands typically occur between 1 100 and 1 130 $cm^{-1}$).

Figure 25:
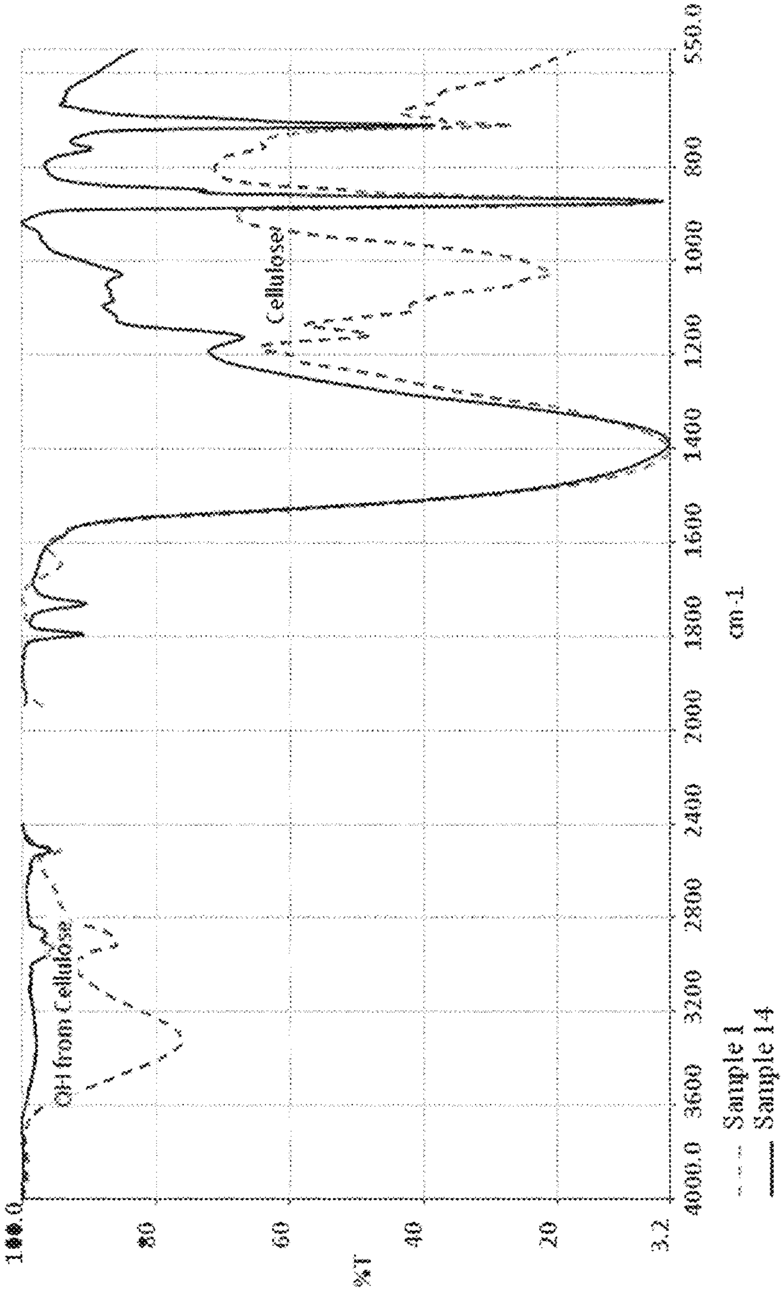
FIG. 25 shows FTIR spectra of comparative substrates.
Figure 26:
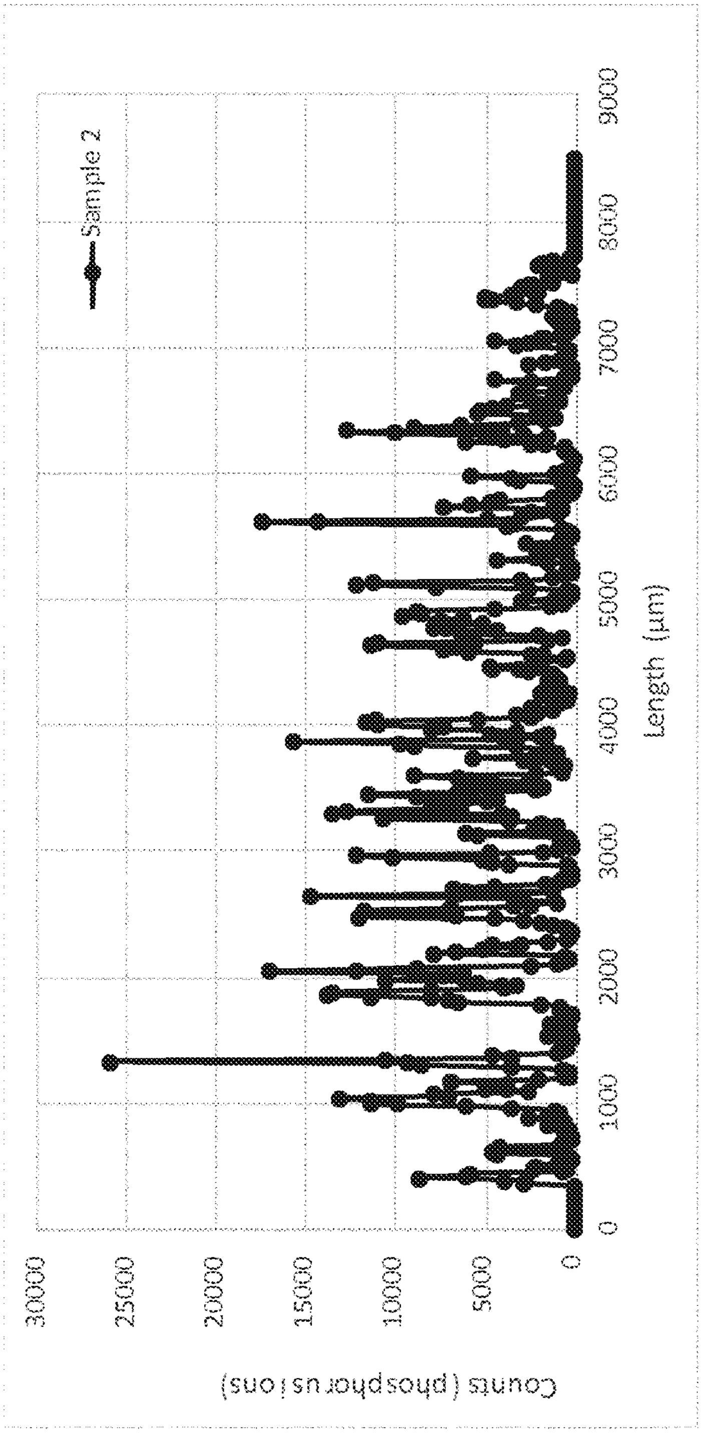
FIGS. 26 to 29 show graphs of LA-ICP-MS measurements of comparative substrates and tagged substrates according to the present invention.
Figure 27:
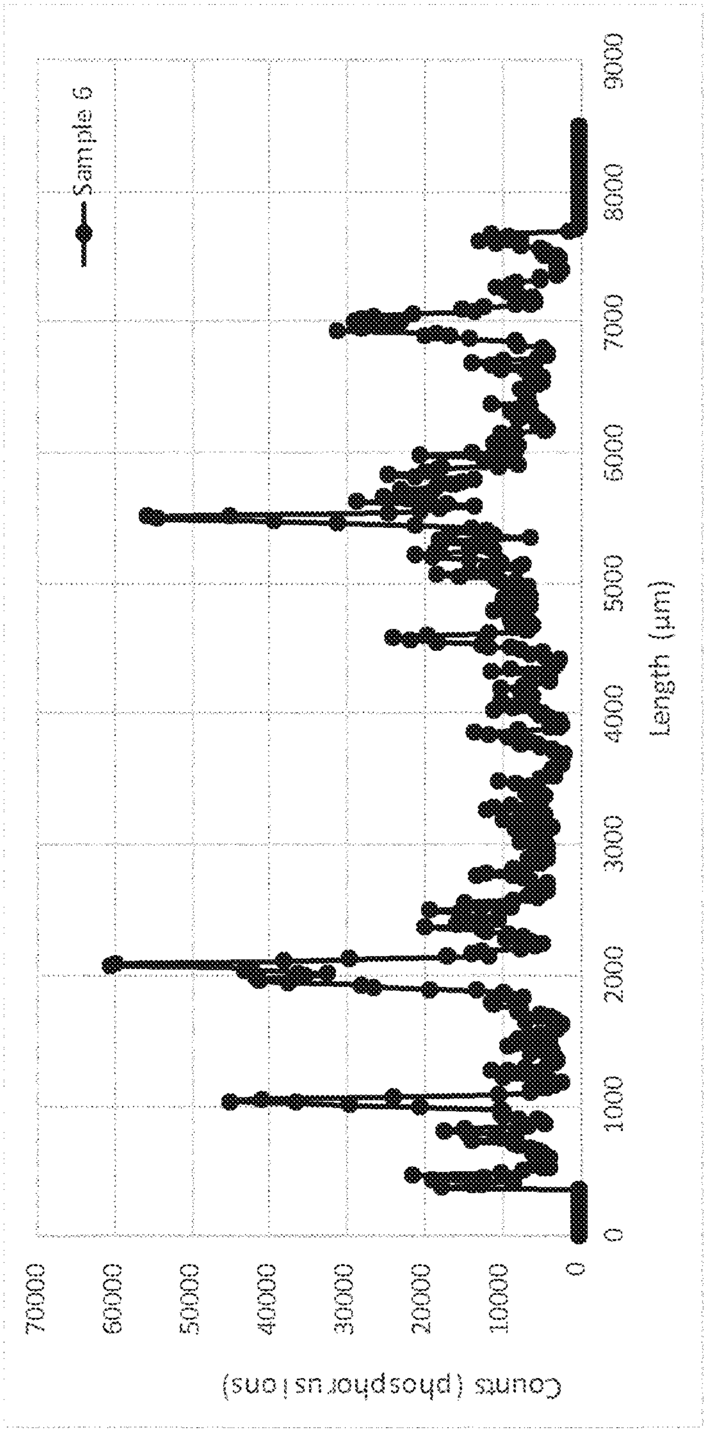
Figure 28:
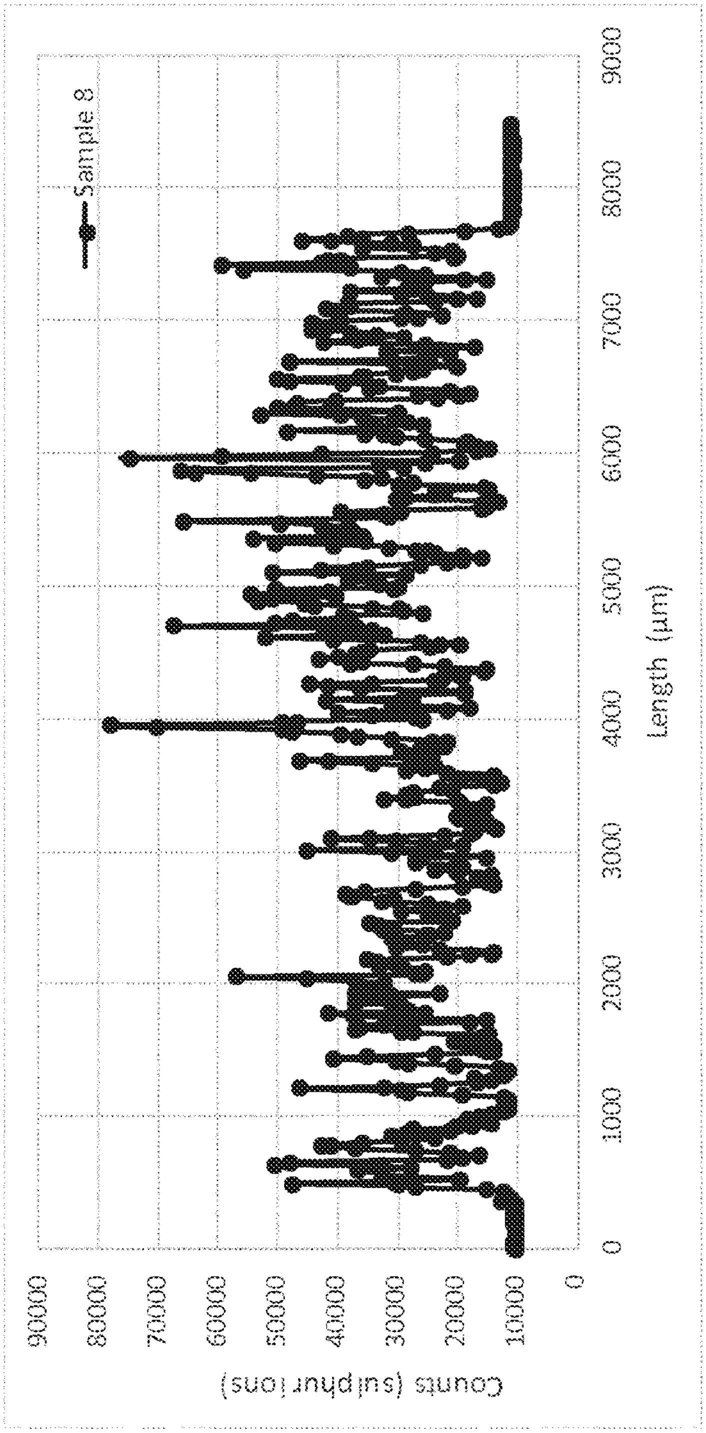
Figure 29:
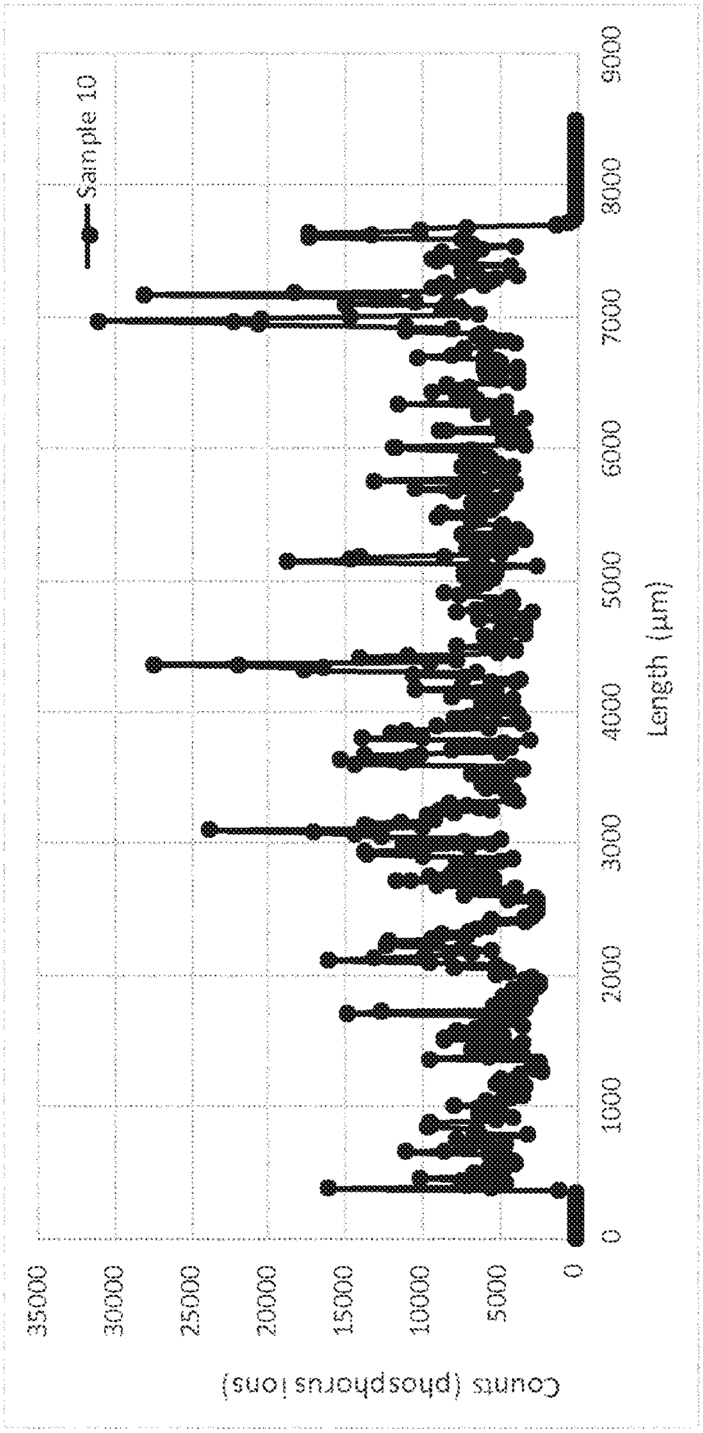

A comparison of the FTIR spectra of comparative sample 1, and comparative sample 14, which contains an opaque top layer but has not been treated with a liquid treatment composition, is shown in FIG. 25.

The results of the IR band analysis are compiled in Table 3 below.

TABLE 3

Results of analysis of FTIR spectra.

| Sample | phosphate band | sulphate band | other bands |
|---|---|---|---|
| 1 | — | — | cellulose and $CaCO_3$ |
| 2 | ++ (dihydrogen phosphate) | — | — |
| 3 | ++ (dihydrogen phosphate) | — | — |
| 4 | — | +++ (gypsum) | — |
| 5 | — | +++ (gypsum) | — |
| 6 | + | — | — |
| 7 | + | — | — |
| 10 | +++ | — | — |
| 11 | +++ | — | — |
| 12 | — | + (gypsum) | — |
| 13 | — | + (gypsum) | — |

(+++: strong band, ++: medium band, +: weak band).

Results of LA-ICP-MS

Inductively coupled plasma mass spectrometry combined with laser ablation was used to analyse samples 2, 6, 8, and 10.

A laser ablation unit (ESI NWR213 laser ablation system, Electro Scientific Industries, Inc., USA) with a He gas flow of 0.6 l/min was used to scan over a line length of ca 8500 μm, with a laser spot diameter of 60μat a speed of 40 μm/s. The laser power was set on 40%. For inductively coupled plasma mass spectrometry (ICP-MS), a Perkin Elmer Elan DRC-e (PerkinElmer Inc., USA) was used to count the ions detected (phosphor and sulphur), using a total dwell time of 390 ms per cycle, a lens voltage of 6 V, and a nebulizer gas flow of 0.66 l/min.

The results of the LA-ICP-MS measurements are shown in FIGS. 26 to 29, which show the amount (number) of counted ions, as function of a scanned line (length in micrometers). For the samples 2, 6 and 10 detection was made for phosphor (see FIGS. 16, 27, and 29). For sample 8, detection was made for sulphur (see FIG. 28). The variation in detected counts per micrometer is due to the uneven distribution of the very small amount of the applied liquid treatment compositions. The LA-ICP-MS measurements confirm that the LA-ICT-MS method is capable of detecting the elements of the additional phases, which were formed by the application of the liquid treatment composition, at a high precision.

The results of the X-ray diffractometry, energy-dispersive X-ray spectroscopy, FTIR spectroscopy, and LA-ICT-MS confirm that by the inventive method a material modification can be created in a substrate, which can be detected by spectroscopic methods. Furthermore, due to the opaque top layer the created modifications are not visible to the naked eye, and, therefore, can be used as a covert security feature, which can only be traced with special equipment and knowledge on what to look for.

3.2. Example 2

Tagged substrates were produced by applying the liquid treatment composition L1 in an amount of 6 ml/$m^2$ onto substrate S2. This was done by applying the treatment composition continuously onto substrate S2 at room temperature within a distance from the external surface of about 15 cm, using an air brush attached to the in-house pressure line. The air brush was operated at a pressure of 2 bar.

After the liquid treatment composition has dried, the obtained surface-modified region was over-coated with an opaque top layer formulation comprising the pigment and the binder mentioned above. The coating was carried out with laboratory tabletop rod coater (K202 Control Coater, RK PrintCoat Instruments Ltd., United Kingdom). The composition of the coating formulation was 100 pph pigment and 8 pph binder, wherein the “pph” values are weight based. The solids content of the coating formulation was 42 wt.-%, based on the total weight of the coating formulation, and the obtained coat weight was 7 g/$m^2$. The prepared samples were dried under hot air at 150° C. after coating.

The obtained opaque top layer had a white colour and a final binder concentration of 8 wt.-%, based on the total weight of pigment.

The application of the liquid treatment composition L1 and the over-coating with the opaque top layer formulation was either carried out on the top side of substrate S2 (sample 16) or on the wire side of substrate S2 (sample 17).

The obtained tagged substrates (samples 16 and 17) and the untreated substrate S2 (comparative sample 18) were analysed by FTIR spectroscopy and energy-dispersive X-ray spectroscopy.

Results of FTIR Spectroscopy

The analysis of the measured FTIR spectra revealed that the samples which were treated with the liquid treatment composition L1 show characteristic phosphate bands.

Figure 31:
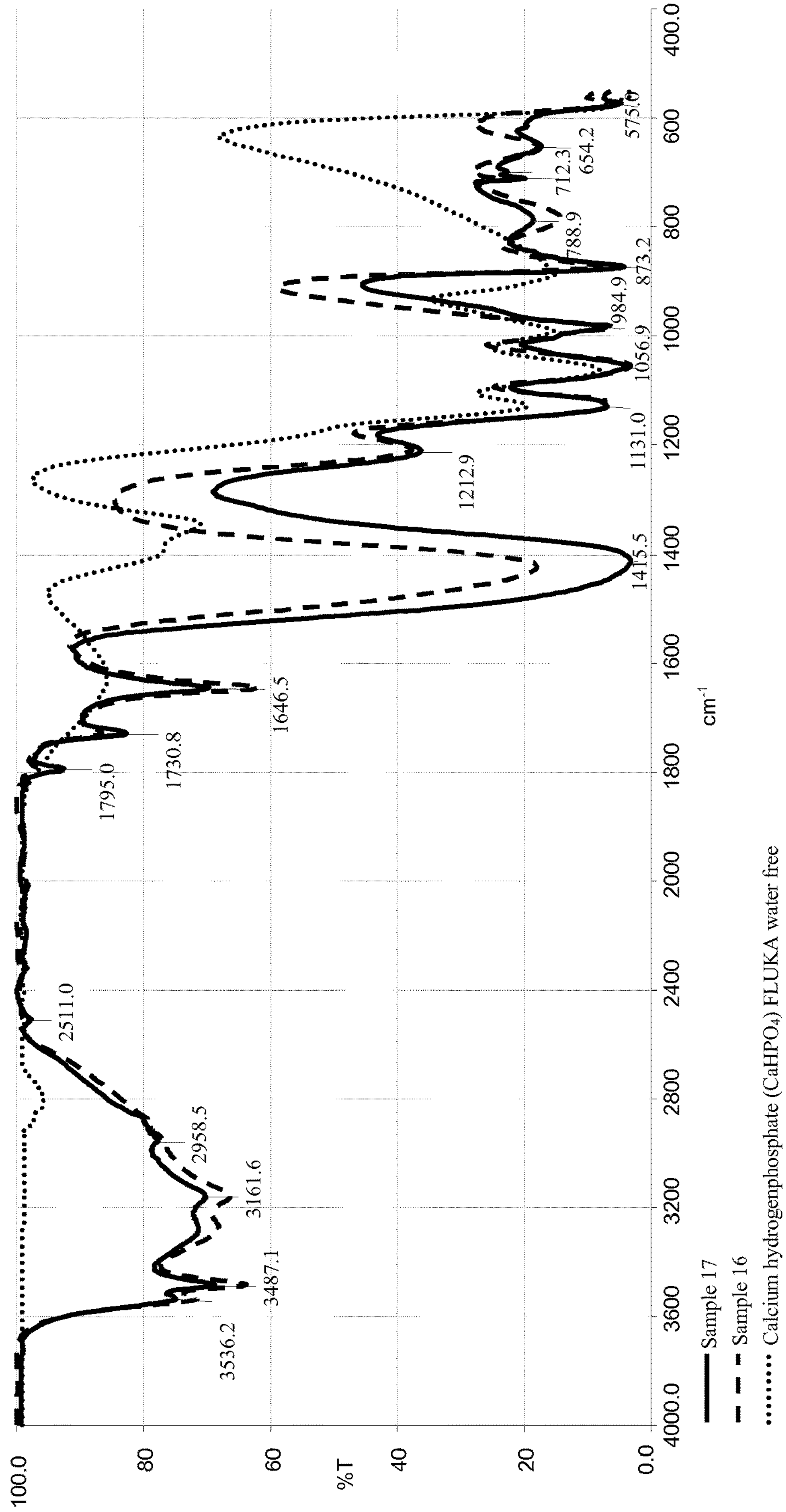
FIG. 31 shows FTIR spectra of calcium hydrogenphosphate and tagged substrates according to the present invention.

As can be gathered from the FTIR spectra of samples 16 and 18 shown in FIG. 30, the inventive sample shows phosphate bands at 1213 $cm^{-1}$, 1131 $cm^{-1}$, 1057 $cm^{-1}$, and 985 $cm^{-1}$. The bands were identified on the basis of a reference spectrum of $Ca(H_2PO_4)_2$, which is shown in FIG. 31. Moreover, FIG. 31 confirms that the surface modifications could be successfully carried out on the top side as well as on the wire side of the uncoated paper substrate S2, and that the surface modification is easy to detect on each of the two sides.

Results of Energy-Dispersive X-Ray (EDS) Spectroscopy

Figure 32:
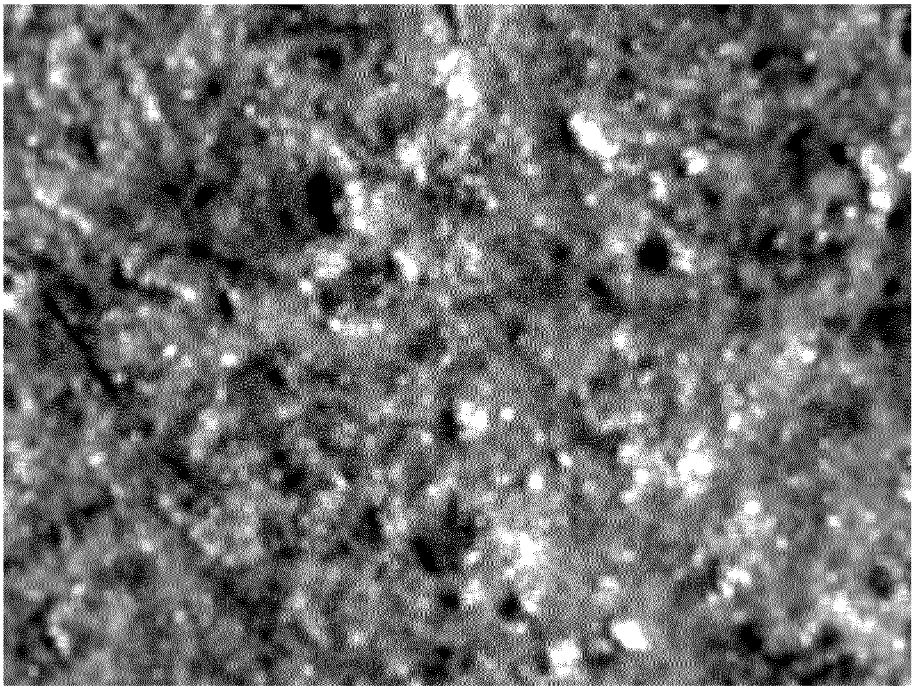
FIGS. 32 and 33 show an SEM/EDS analysis of a tagged substrate according to the present invention.
Figure 33:
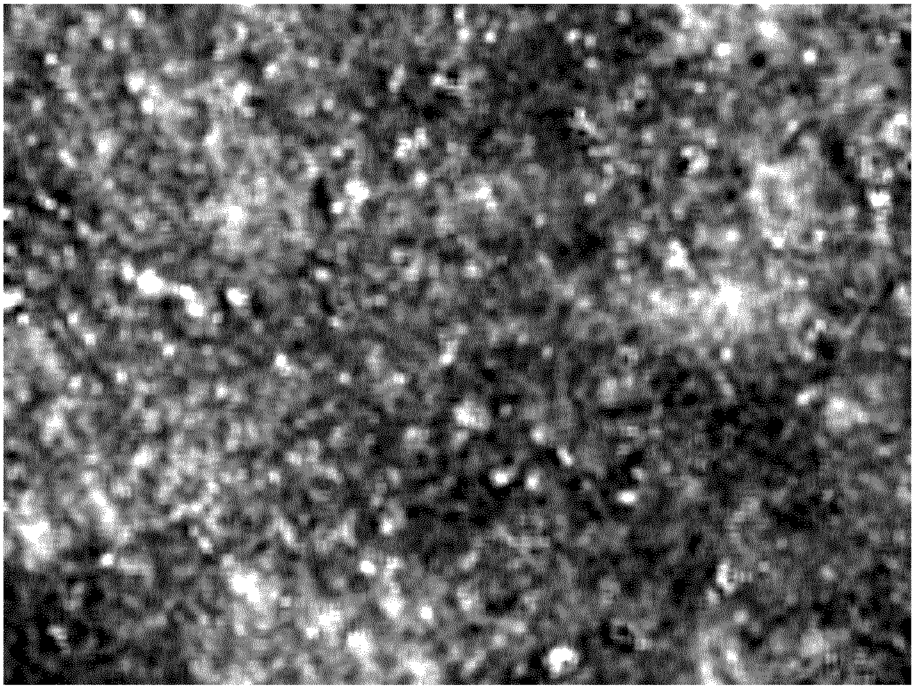
Figure 34:
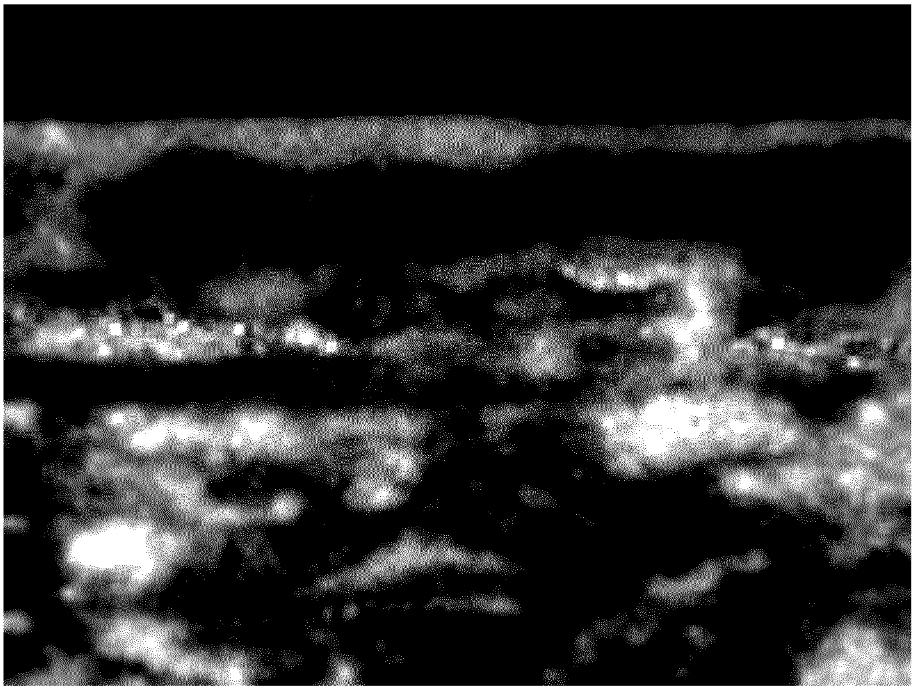
FIGS. 34 and 35 show SEM/EDS micrographs of a cross-section of a tagged substrate according to the present invention.
Figure 35:
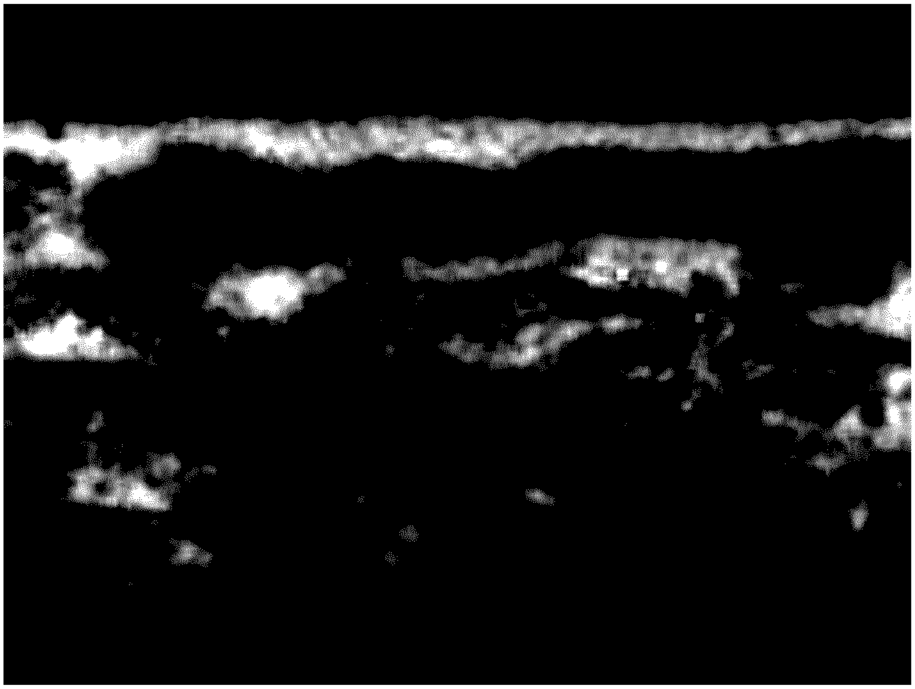

The results of the EDS analysis confirmed that additional phases were formed by the application of the liquid treatment compositions, which can be detected by EDS spectroscopy. A map of the crystal calcium phase of inventive sample 16 is shown in FIG. 32, wherein the calcium-containing phases are highlighted in white, and a map of the crystal phosphor-containing phases of inventive sample 16 is shown in FIG. 33, wherein the phosphor-containing phases are highlighted in white. SEM pictures showing cross-sections of sample 16 are shown in FIGS. 34 and 35, wherein in FIG. 34 the calcium-containing phases are highlighted in white and in FIG. 35 the phosphor-containing phases are highlighted in white. It can be gathered from FIGS. 34 and 35 that crystal phases comprising calcium and phosphor are also formed in the opaque top layer.

The results of the FTIR spectroscopy and the energy-dispersive X-ray spectroscopy confirm that by the inventive method a material modification can be created in an uncoated substrate, which can be detected by spectroscopic methods. Furthermore, due to the opaque top layer the created modifications are not visible to the naked eye, and, therefore, can be used as a covert security feature, which can only be traced with special equipment and knowledge on what to look for.

The invention claimed is:

1. A method of verifying the authenticity of a product, comprising the following steps:

I) providing a product with a tagged substrate comprising a covert, spectroscopically detectable security feature, II) recording a spectrum of the substrate by a spectroscopic method, and III) detecting the presence of the security feature by comparing the recorded spectrum with a library of spectra of tagged substrates, wherein the tagged substrate comprising the covert, spectroscopically detectable security feature is obtainable by a method comprising the following steps:

a) providing a substrate, wherein the substrate comprises at least one external surface comprising a salifiable alkaline or alkaline earth compound, b) providing a liquid treatment composition comprising at least one acid, c) applying the liquid treatment composition onto at least one region of the at least one external surface to form at least one surface-modified region on or within the at least one external surface, and d) applying an opaque top layer over the at least one surface-modified region obtained in step c).

2. The method of claim 1, wherein the substrate comprises the salifiable alkaline or alkaline earth compound in the form of a filler material.

3. The method of claim 1, wherein the product is a branded product, a security document, a non-secure document, a decorative product, a drug, a tobacco product, an alcoholic drug, a bottle, a garment, a packaging, a container, a sporting good, a toy, a game, a mobile phone, a compact disc (CD), a digital video disc (DVD), a blue ray disc, a machine, a tool, a car part, a sticker, a label, a tag, a poster, a passport, a driving licence, a bank card, a credit card, a bond, a ticket, a postage or tax stamp, a banknote, a certificate, a brand authentication tag, a business card, a greeting card, or a wall paper.

4. The method of claim 1, wherein the tagged substrate is suitable for use in security applications, in overt security elements, in covert security elements, in brand protection, in microlettering, in micro imaging, in decorative applications, in artistic applications, or in packaging applications.

5. The method of claim 1, wherein the at least one external surface of step a) is in the form of a laminate or a coating layer comprising the salifiable alkaline or alkaline earth compound.

6. The method of claim 1, wherein the substrate is selected from the group consisting of paper, cardboard, containerboard, plastic, non-wovens, cellophane, textile, wood, metal, glass, mica plate, marble, calcite, nitrocellulose, natural stone, composite stone, brick, concrete, and laminates or composites thereof.

7. The method of claim 1, wherein the substrate is selected from the group consisting of paper, cardboard, containerboard, or plastic.

8. The method of claim 1, wherein (i) the at least one external surface and the substrate of step a) are made from the same material.

9. The method of claim 1, wherein the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, lithium carbonate, sodium carbonate, potassium carbonate, magnesium carbonate, calcium magnesium carbonate, calcium carbonate, ground calcium carbonate, a precipitated calcium carbonate, a surface-treated calcium carbonate, or mixtures thereof.

10. The method of claim 1, wherein the salifiable alkaline or alkaline earth compound is selected from lithium carbonate, sodium carbonate, potassium carbonate, magnesium carbonate, calcium magnesium carbonate, calcium carbonate, or mixtures thereof.

11. The method of claim 1, wherein the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulphur compounds, acidic organophosphorus compounds, $HSO_4^-$, $H_2PO_4^-$or $HPO_4^{2-}$, being at least partially neutralized by a corresponding cation selected from $Li^+$, $Na^+$, $K^+$, $Mg^{2+}$ or $Ca^{2+}$, and mixtures thereof.

12. The method of claim 1, wherein the at least one acid is selected from the group consisting of hydrochloric acid, sulphuric acid, sulphurous acid, phosphoric acid, oxalic acid, boric acid, suberic acid, succinic acid, sulphamic acid, tartaric acid, and mixtures thereof.

13. The method of claim 1, wherein the at least one acid is phosphoric acid and/or sulphuric acid.

14. The method of claim 1, wherein the liquid treatment composition further comprises a fluorescent dye, a phosphorescent dye, an ultraviolet absorbing dye, a near infrared absorbing dye, a thermochromic dye, a halochromic dye, metal ions, transition metal ions, magnetic particles, quantum dots, or a mixture thereof.

15. The method of claim 1, wherein the liquid treatment composition comprises the acid in an amount from 0.1 to 100 wt.-%, based on the total weight of the liquid treatment composition.

16. The method of claim 1, wherein the liquid treatment composition is applied in the form of a continuous layer, a pattern of repetitive elements, or repetitive combination(s) of elements, circles, dots, triangles, rectangles, squares, or lines.

17. The method of claim 1, wherein the opaque top layer is a top coat, a pigment layer, an overprint, a metal coating, a metal foil, a fibre layer, a laminate, a polymer foil, or a paper.

18. The method of claim 1, wherein the spectroscopic method is selected from the group consisting of infrared spectroscopy, X-ray spectroscopy, and combinations thereof.

19. The method of claim 1, wherein the spectroscopic method is selected from the group consisting of FTIR spectroscopy, X-ray diffractometry (XRD), energy dispersive X-ray spectroscopy (EDS), and combinations thereof.

20. The method of claim 1, wherein the spectroscopic method is selected from the group consisting of FTIR spectroscopy, energy-dispersive X-ray spectroscopy (EDS), and combinations thereof.

* * * * *